US012784590B1

(12) United States Patent
Alayban et al.

(10) Patent No.: US 12,784,590 B1
(45) Date of Patent: Nov. 3, 2026

(54) INTELLIGENT CONTEXT-AWARE DRIVER ASSISTANCE SYSTEM FOR GENERATING CONTROLLED-SPEED ZONE ALERTS

(71) Applicant: Saudi Technology and Security Comprehensive Control Co. Ltd., Riyadh (SA)

(72) Inventors: Dalal Fahad Alayban, Riyadh (SA); Khalid Naji Alharbi, Riyadh (SA); Nouf Fahad Alfulayj, Riyadh (SA)

(73) Assignee: Saudi Technology and Security Comprehensive Control Co. Ltd., Riyadh (SA)

( * ) Notice: Subject to any disclaimer, the term of this patent is extended or adjusted under 35 U.S.C. 154(b) by 0 days.

(21) Appl. No.: 19/397,522

(22) Filed: Nov. 21, 2025

(51) Int. Cl.

*G08G 1/0967* (2006.01)
*G06V 20/54* (2022.01)
*G07C 5/02* (2006.01)
*G08G 1/01* (2006.01)
*G08G 1/052* (2006.01)

(52) U.S. Cl.

CPC ....... *G08G 1/096741* (2013.01); *G06V 20/54* (2022.01); *G07C 5/02* (2013.01); *G08G 1/0133* (2013.01); *G08G 1/052* (2013.01); *G06V 2201/08* (2022.01)

(58) Field of Classification Search

CPC ........... G08G 1/096741; G08G 1/0133; G08G 1/052; G06V 20/54; G06V 2201/08; G07C 5/02

See application file for complete search history.

(56) References Cited

U.S. PATENT DOCUMENTS

| | | | | |
|---|---|---|---|---|
| 2021/0053579 A1* | 2/2021 | Gaudin | ................. | G06Q 40/08 |
| 2021/0405185 A1* | 12/2021 | Price | ....................... | B60R 11/02 |
| 2022/0388505 A1* | 12/2022 | Sharma Banjade | ......................... | B60W 30/0956 |
| 2023/0166743 A1* | 6/2023 | Heck | ...................... | G06N 3/044 |
| 2025/0029488 A1* | 1/2025 | Zahid | ..................... | G06N 20/00 |
| 2025/0316069 A1* | 10/2025 | Chen | ...................... | G06V 10/72 |
| 2025/0380108 A1* | 12/2025 | Judge | .................... | H04W 4/021 |

* cited by examiner

*Primary Examiner* — Kito R Robinson
*Assistant Examiner* — Erin Marie Hartmann
(74) *Attorney, Agent, or Firm* — Baker & McKenzie LLP

(57) ABSTRACT

Disclosed are urban intelligence methods and systems for generating, based on an intelligent driver assistance system, an alert. An exemplary method includes: receiving first data and second sensor data associated with a driving environment; fusing the first and second sensor data; pre-processing the first fused sensor data; determining, based on a first accessing of one or more intelligence models, first road-level data; determining, based on a second accessing, that the driving environment is not speed-controlled; receiving third sensor data and fourth sensor data; fusing; pre-processing; determining, based on a third accessing, second road-level data; determining, based on a fourth accessing, that the driving environment is a speed-controlled environment; initiating a first alert to a vehicle operator; monitoring for a response or a speed of a vehicle; receiving the response or the speed; determining the response or the speed is insufficient to comply with the speed-controlled environment; and generating a second alert.

20 Claims, 7 Drawing Sheets

INTELLIGENT CONTEXT-AWARE DRIVER ASSISTANCE SYSTEM FOR GENERATING CONTROLLED-SPEED ZONE ALERTS

TECHNICAL FIELD

The present systems and methods are directed to urban intelligence solutions for alerting drivers based on speed-controlled traffic zones.

BACKGROUND

There is a need for an advanced driver assistance system capable of identifying nuanced driving environment cues and suggesting speed adjustments.

SUMMARY

In the context of intelligent driver assistance systems, urban intelligence may incorporate a wide array of vehicle capabilities to interpret, adapt to, and respond to complex driving environments using advanced sensing, data analytics, and real-time or substantially real-time decision-making. For example, urban intelligence solutions may enable controlled-speed zone alerting and safe navigation by integrating traffic patterns, pedestrian behavior, and/or infrastructure signals to optimize driver support in any driving environment.

A disclosed method for generating, based on an intelligent driver assistance system, a contextualized speed-controlled zone alert, comprises: receiving, using one or more computing device processors, at a first time, first sensor data associated with a driving environment; receiving, using the one or more computing device processors, at the first time or at a second time after the first time, second sensor data associated with the driving environment; fusing, using the one or more computing device processors, the first sensor data and the second sensor data, thereby generating first fused sensor data; pre-processing, using the one or more computing device processors, the first fused sensor data, thereby generating first pre-processed sensor data; determining, using the one or more computing device processors, based on a first accessing of one or more intelligence models, first road-level data associated with the first pre-processed sensor data; determining, using the one or more computing device processors, based on a second accessing of one or more intelligence models associated with the first road-level data, that the driving environment is not speed-controlled; receiving, using the one or more computing device processors, at a third time, third sensor data associated with the driving environment; receiving, using the one or more computing device processors, at the third time or at a fourth time after the third time, fourth sensor data associated with the driving environment; fusing, using the one or more computing device processors, the third sensor data and the fourth sensor data, thereby generating second fused sensor data; pre-processing, using the one or more computing device processors, the second fused sensor data, thereby generating second pre-processed sensor data; determining, using the one or more computing device processors, based on a third accessing of one or more intelligence models, second road-level data associated with the second pre-processed sensor data; determining, using the one or more computing device processors, based on a fourth accessing of one or more intelligence models associated with the second road-level data, that the driving environment is a speed-controlled driving environment; in response to determining the speed-controlled driving environment, initiating, using the one or more computing device processors, at a fifth time after the fourth time, a first alert associated with the speed-controlled driving environment to a vehicle operator; monitoring, using the one or more computing device processors, for a response associated with the vehicle operator to the first alert or a speed of a vehicle; receiving, using the one or more computing device processors, the response associated with the vehicle operator to the first alert or the speed of the vehicle; determining, using the one or more computing device processors, the response associated with the vehicle operator to the first alert is insufficient to comply with, or the speed of the vehicle is insufficient to comply with, the speed-controlled driving environment; and generating, using the one or more computing device processors, at a sixth time after the fifth time, based on the determining the response associated with the vehicle operator to the first alert is insufficient to comply with, or the speed of the vehicle is insufficient to comply with, the speed-controlled driving environment, a second alert associated with the speed-controlled driving environment to the vehicle operator.

In some cases, at least one of the receiving the first sensor data, the second sensor data, the third sensor data, or the fourth sensor data comprises using one or more advanced driver assistance systems, wherein the one or more advanced driver assistance systems comprise using or communicating with at least one of: a camera, a radar sensor, a light detection and ranging sensor (LiDAR), a global positioning system (GPS) sensor, a vehicle telemetry sensor, or a weather sensor.

In other cases, determining at least one of the first road-level data or the second road-level data comprises one or more feature extraction processes, wherein the one or more feature extraction processes are based on at least one of: a road analysis, an infrastructure classification, a vegetation analysis, a traffic density estimation, or a vehicle behavior pattern recognition.

In some embodiments, the one or more intelligence models comprise one or more contextual reasoning models, wherein the one or more contextual reasoning models are based on at least one of: a geographical context integration, an environmental condition analysis, or an operator behavior profile.

In other embodiments, the geographical context integration comprises at least one of: a correlation with one or more predefined locations, a geofence, or traffic data.

According to some embodiments, the environmental condition analysis is based on at least one of: a weather assessment, a road condition assessment, or a visibility assessment.

In other embodiments, the operator behavior profile comprises at least one of: a driving pattern, a response time, or a behavioral prediction.

One or more systems are disclosed for generating, based on an intelligent driver assistance system, a contextualized alert associated with a speed-controlled driving environment, the one or more systems comprise: one or more computing databases; one or more computing servers comprising one or more computing device processors and a memory storing instructions, the instructions being executable by the one or more computing device processors to: receive, at a first time, first sensor data associated with a driving environment; receive, at the first time or at a second time after the first time, second sensor data associated with the driving environment; fuse the first sensor data and the second sensor data, thereby generating first fused sensor data; pre-process the first fused sensor data, thereby generating first pre-processed sensor data; determine, based on a first accessing of one or more intelligence models, first road-level data associated with the first pre-processed sensor data; determine, based on a second accessing of one or more intelligence models associated with the first road-level data, that the driving environment is not speed-controlled; receive, at a third time, third sensor data associated with the driving environment; receive, at the third time or at a fourth time after the third time, fourth sensor data associated with the driving environment; fuse the third sensor data and the fourth sensor data, thereby generating second fused sensor data; pre-process the second fused sensor data, thereby generating second pre-processed sensor data; determine, based on a third accessing of one or more intelligence models, second road-level data associated with the second pre-processed sensor data; determine, based on a fourth accessing of one or more intelligence models associated with the second road-level data, that the driving environment is a speed-controlled driving environment; in response to determining the speed-controlled driving environment, initiate, at a fifth time after the fourth time, a first alert associated with the speed-controlled driving environment to a vehicle operator; monitor for a response associated with the vehicle operator to the first alert or a speed of a vehicle; receive the response associated with the vehicle operator to the first alert or the speed of the vehicle; determine the response associated with the vehicle operator to the first alert is insufficient to comply with, or the speed of the vehicle is insufficient to comply with, the speed-controlled driving environment; and generate, at a sixth time after the fifth time, based on the determine the response associated with the vehicle operator to the first alert is insufficient to comply with, or the speed of the vehicle is insufficient to comply with, the speed-controlled driving environment, a second alert associated with the speed-controlled driving environment to the vehicle operator.

In one embodiment, at least one of the first alert or the second alert comprise at least one of: a personalized alert, a visual alert, an auditory alert, or a haptic alert.

In another embodiment, the personalized alert incorporates at least one of: the visual alert, the auditory alert, or the haptic alert, and the personalized alert is based on at least one of: a driving pattern, a situation assessment, or a redundancy alert.

In some cases, the visual alert comprises at least one of: a dashboard icon, a heads-up display, or an augmented reality overlay.

In other cases, the auditory alert comprises at least one of: a volume adjustment, a tone variation, or a prompt.

In yet other cases, the haptic alert comprises at least one of: a vibration, a temperature modulation, or a pedal resistance variation.

In another embodiment for generating, based on an intelligent driver assistance system, a contextualized alert associated with a speed-controlled driving environment, the method comprises: receiving, using one or more computing device processors, at least one first sensor data associated with a driving environment; determining, using the one or more computing device processors, based on a first accessing of one or more intelligence models, first driving environment data associated with the at least one first sensor data; determining, using the one or more computing device processors, based on a second accessing of one or more intelligence models associated with the first driving environment data, that the driving environment is not speed-controlled; receiving, using the one or more computing device processors, at least one second sensor data associated with the driving environment; determining, using the one or more computing device processors, based on a third accessing of one or more intelligence models, second driving environment data associated with the at least one second sensor data; determining, using the one or more computing device processors, based on a fourth accessing of one or more intelligence models associated with the second driving environment data, that the driving environment is a speed-controlled driving environment; in response to determining the speed-controlled driving environment, initiating, using the one or more computing device processors, a first alert associated with the speed-controlled driving environment to a vehicle operator; monitoring, using the one or more computing device processors, for a response associated with the vehicle operator to the first alert or a speed of a vehicle; receiving, using the one or more computing device processors, the response associated with the vehicle operator to the first alert or the speed of the vehicle; determining, using the one or more computing device processors, the response associated with the vehicle operator to the first alert is insufficient to comply with, or the speed of the vehicle is insufficient to comply with, the speed-controlled driving environment; and generating, using the one or more computing device processors, based on the determining the response associated with the vehicle operator to the first alert is insufficient to comply with, or the speed of the vehicle is insufficient to comply with, the speed-controlled driving environment, a second alert associated with the speed-controlled driving environment to the vehicle operator.

In one embodiment, at least one of the receiving the at least one first sensor data or the at least one second sensor data comprises using one or more advanced driver assistance systems, wherein the one or more advanced driver assistance systems comprises using or communicating with at least one of: a camera, a radar sensor, a light detection and ranging (LiDAR) sensor, a global positioning system (GPS) sensor, a vehicle telemetry sensor, or a weather sensor.

In another embodiment, determining at least one of the first driving environment data or the second driving environment data comprises one or more feature extraction processes, wherein the one or more feature extraction processes are based on at least one of: a road analysis, an infrastructure classification, a vegetation analysis, a traffic density estimation, or a vehicle behavior pattern recognition.

In some cases, the one or more intelligence models are based on one or more deep learning classification models, wherein the one or more deep learning classification models comprise at least one of: a convolutional neural network, a recurrent neural network, a transformer system, or an ensemble method.

In other cases, the method further comprises sharing, using the one or more computing device processors, at least one of the first alert or the second alert to one or more vehicles.

According to one embodiment, the method further comprises sharing, using the one or more computing device processors, at least one of the first alert or the second alert to one or more traffic management systems.

In yet another embodiment, the one or more computing device processors are comprised in one or more computing systems, wherein the one or more computing systems are located in one or more locations.

BRIEF DESCRIPTION OF DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

Reference will now be made in detail to embodiments, examples of which are illustrated in the accompanying drawings and figures. In the following detailed description, numerous specific details are set forth in order to provide a thorough understanding of the disclosed subject-matter. However, it will be apparent to one of ordinary skill in the art that the methods and systems disclosed may be practiced without these specific details.

As used herein, the term "exemplary" or "illustrative" means "serving as an example, an instance, or an illustration." Any implementation described herein as exemplary or illustrative is not necessarily to be construed as advantageous and/or preferred over other embodiments. Unless the context requires otherwise, throughout the description and the claims, the word "comprise" and variations thereof, such as "comprises" and "comprising" are to be construed in an open, inclusive sense, i.e., as "including, but not limited to."

Furthermore, the terms substantially real-time and near real-time, as used herein, refer to a processing and response timeframe that is close to, but not necessarily equal to, instantaneous or true real-time. While true real-time implies a delay of zero, any practical digital system will have some inherent latency due to data processing, computation, and network transmission. Therefore, these terms describe a timeframe where this inherent latency is sufficiently short as to be negligible for the effective operation of a given process or for the perception of a human user. The specific duration considered to be substantially real-time or near real-time is application-dependent and is defined by the requirements of the system to function as intended without being materially compromised by the delay.

For example, in different embodiments of this disclosure, the acceptable delay can vary significantly. In the context of streaming interactive video or augmented reality, near real-time may correspond to a total latency of less than 200 milliseconds, as longer delays can become perceptible and disruptive to a user. Thus, these terms encompass any timeframe in which the system's response is delivered quickly enough to be relevant and actionable for its specific purpose.

Network Environment

Figure 1:
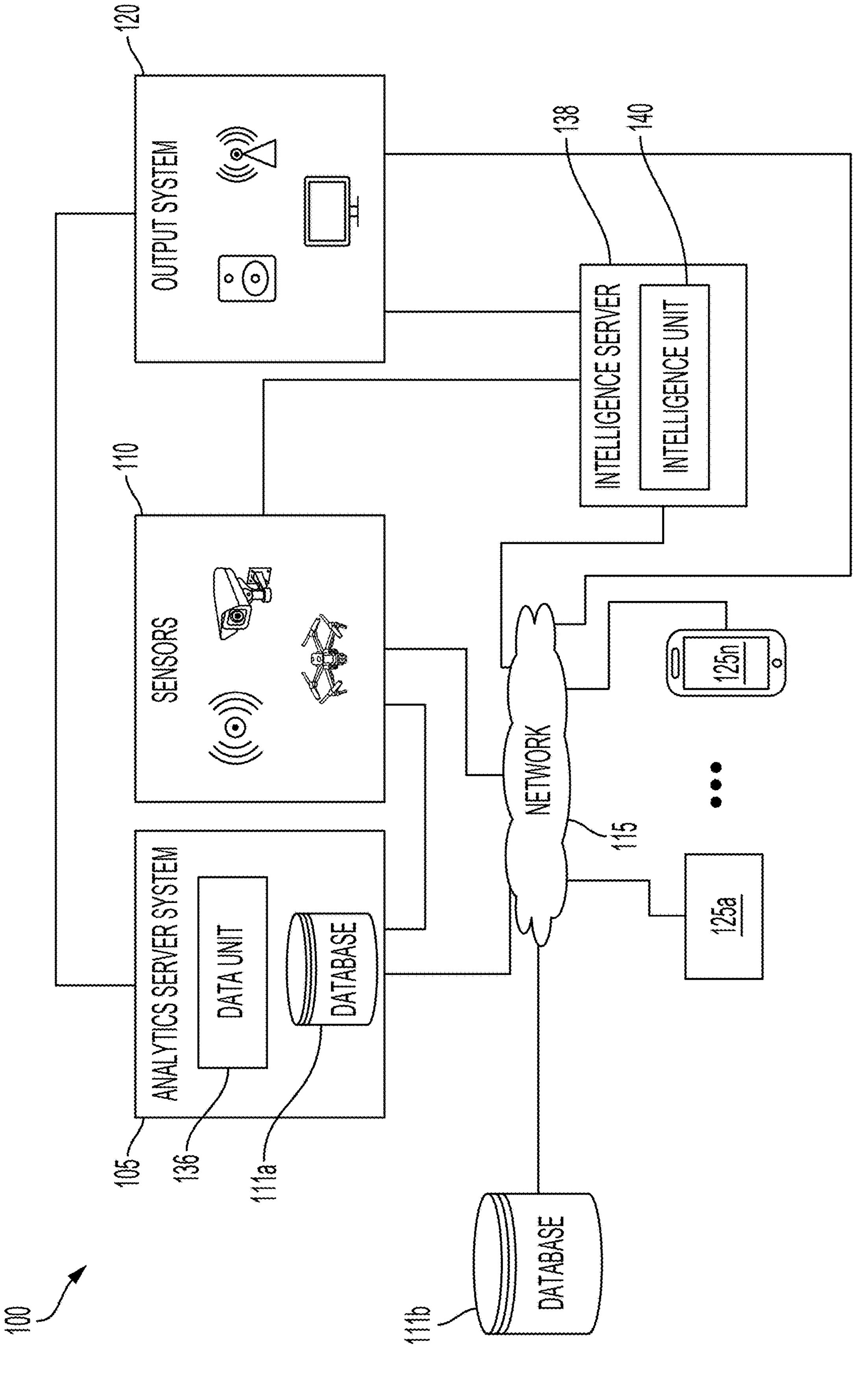
FIG. 1 shows an exemplary network system for executing the principles disclosed.

Shown in FIG. 1 is an exemplary network system 100 for executing the principles disclosed. Specifically, the exemplary network system 100 may be used to implement dynamic tracking of at least motive properties of a vehicle on a roadway. In the illustrated implementation, the network system 100 includes an analytics server system 105, one or more sensors 110, one or more computing databases 111*a* and 111*b*, and one or more output system 120, all of which are communicatively coupled to a network 115. Also connected to the network 115 are one or more endpoint devices 125*a* . . . 125*n* and an intelligence server 138.

It is appreciated that the implementation of the analytics server system 105 and/or the intelligence server 138 may be physically structured in various configurations. In one embodiment, the one or more computing device processors that execute the functions of the analytics server system 105 and/or the intelligence server 138 may be co-located at a single geographical location or housed within a single data center. Alternatively, the one or more computing device processors that execute the functions of the analytics server system 105 and/or the intelligence server 138 may be realized in a distributed computing environment, where multiple computing device processors are spread across disparate physical locations and are communicatively coupled over a network to operate in a coordinated or parallel fashion.

According to one embodiment, the analytics server system 105 includes a computing device such as a content server, a communication server, a laptop computer, a desktop computer, a handheld computing device, a tablet computing device, a virtual machine, a cloud-based computing system and/or a cloud-based service, and/or the like. The analytics server system 105 may include a plurality of computing devices configured to communicate with one another and/or communicate with other systems comprised in the network system 100 to implement the techniques described herein.

According to one embodiment, the analytics server system 105 comprises a data unit 136 (also referred to as one or more data units elsewhere herein) and at least one local computing database 111*a*. For example, results from implementing the disclosed methods may be stored in the local computing database 111*a* or in a remote computing database 111*b* that is physically distal (e.g., implemented in a first location that is different from a second location where the local computing database 111*a* is implemented). According to one embodiment, the local computing database 111*a* and the remote computing database 111*b* may include a non-volatile memory or similar permanent storage device and media. For example, the local computing database 111*a* and the remote computing database 111*b* can be a hard disk drive, a CD-ROM device, a DVD-ROM device, a DVD-RAM device, a DVD-RW device, a flash memory device, solid state media, or some other mass storage device known in the art for storing information on a more permanent basis.

Figure 2:
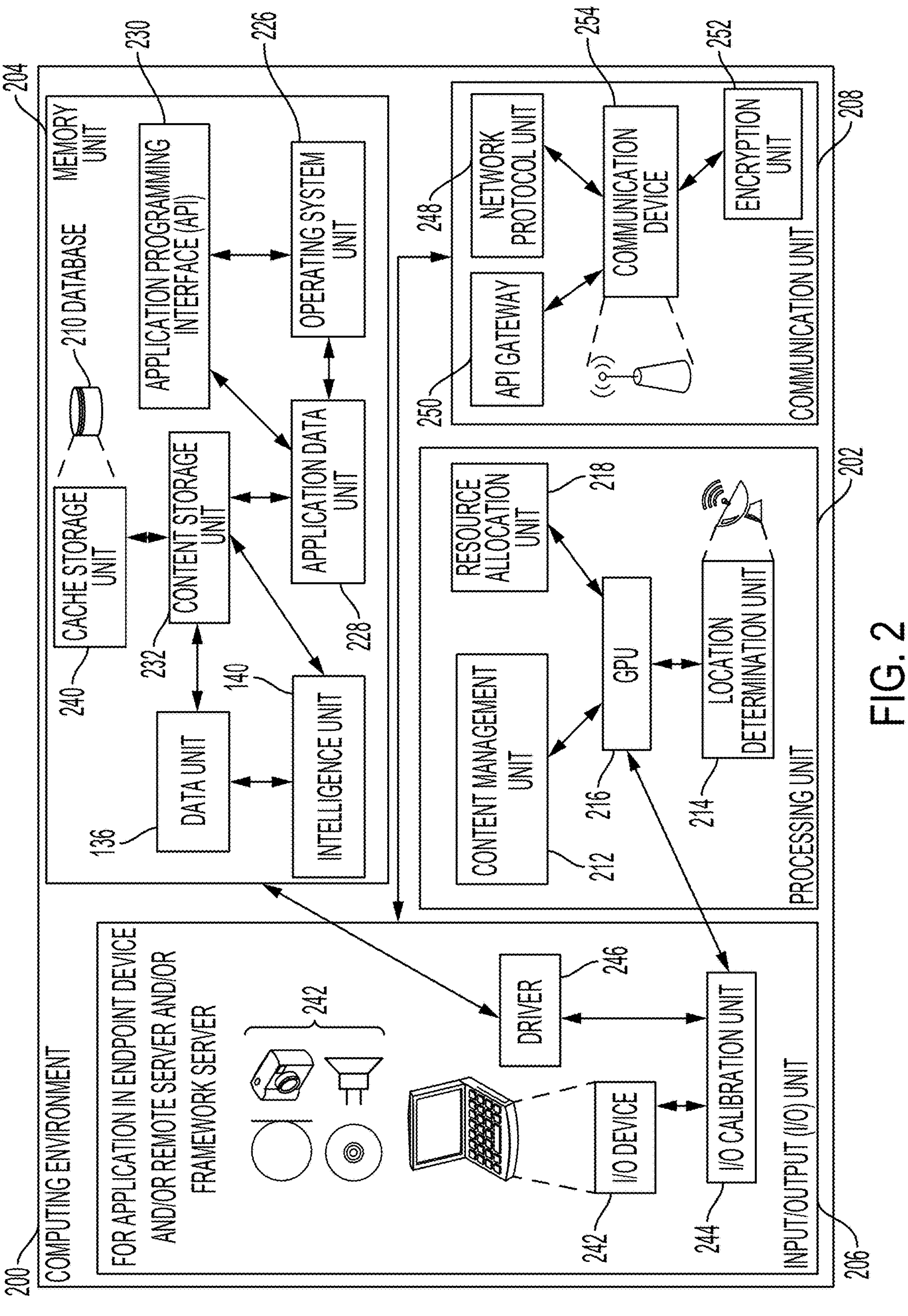
FIGS. 2 and 3 illustrate exemplary system and functional diagrams of a computing environment, within which one or more systems shown in FIG. 1 can be implemented.
Figure 3:
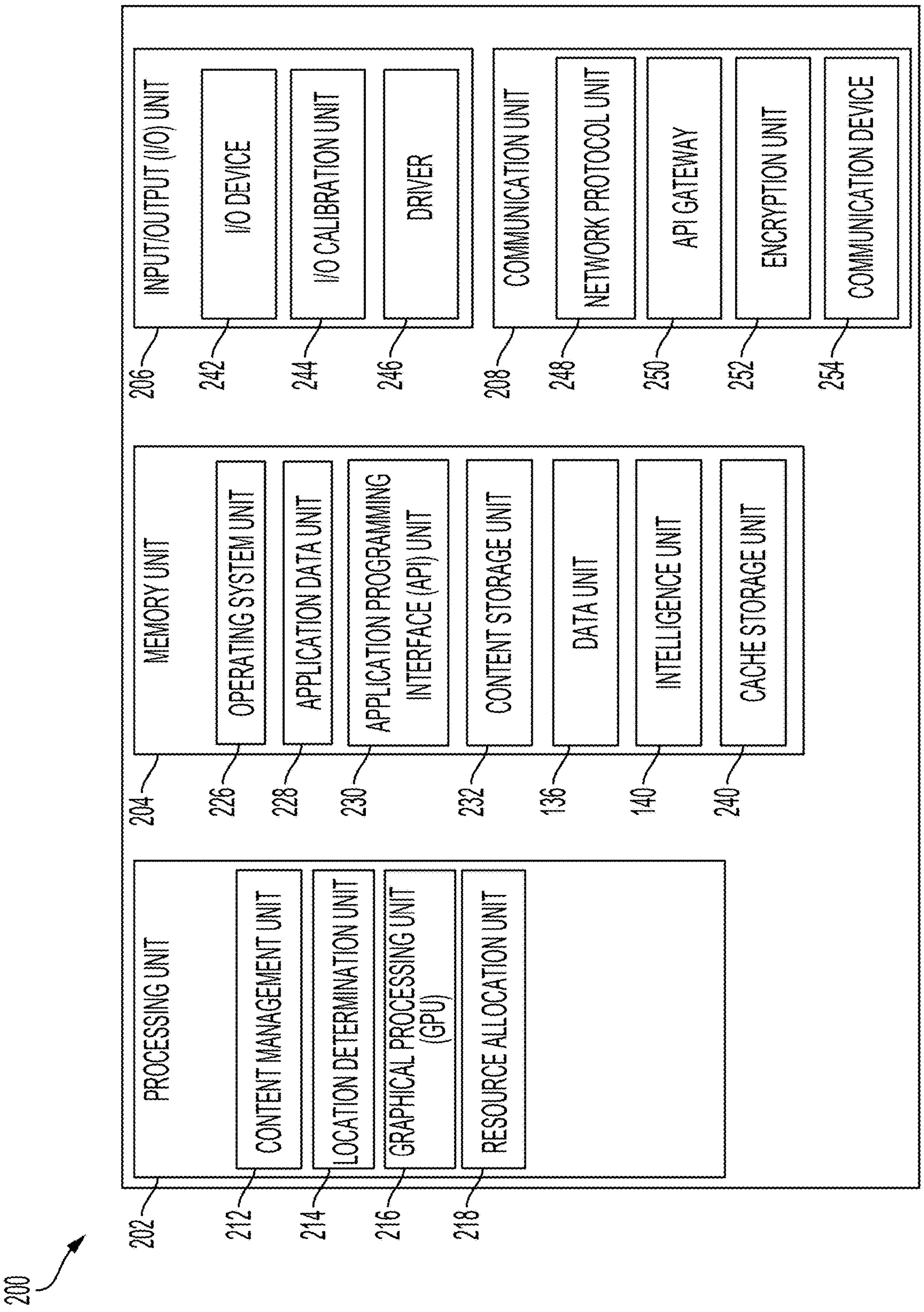

The data unit 136 referenced above may include one or more instructions or computer logic that are executed by the one or more processors such as the processors discussed in association with FIGS. 2 and 3. The data unit 136 referenced herein comprises an executable software module containing one or more instructions or computer-executable logic. These instructions are specifically configured to be executed by one or more processors, such as the processors discussed in association with FIGS. 2 and 3, to perform the disclosed method. In particular, upon execution by said processors, the instructions within the data unit 136 causes a computing system to carry out the specific processing procedures, methods, techniques, and workflows provided in this disclosure. Thus, the data unit 136 represents a tangible software implementation that directs a computing device to function as a specialized machine for executing the disclosed method.

The analytics server system 105 may be configured to communicate with the one or more systems coupled to the network 115. This can include communications between the analytics server system 105 and the sensors 110 to transmit captured substantially real-time data (e.g., static images or dynamic images including or excluding a video stream, audio data, touch data, LiDAR data, etc.) to the intelligence server 138 to resolve, classify, and identify features of objects (e.g., vehicles) captured by the sensors 110. In addition, this communication can involve the transmission of one or more alerts from the analytics server system 105 to the one or more endpoint devices 125*a* . . . 125*n*.

According to one embodiment, the analytics server system 105 can be coupled, via the network 115, to an intelligence server 138 configured to control or regulate, in conjunction with, or independent of the data unit 136, training of one or more computing models configured for implementing data classification and/or object identification computing operations. In some cases, the intelligence server 138 can comprise one or more intelligence units 140 that can implement computing operations such as: zero-shot learning computing operations, few-shot learning computing operations, and result/model fine-tuning computing operations. Additionally, or alternatively, one or more intelligent artificial intelligence (AI) models and/or machine learning (ML) models may comprise, or be based on at least one of: GPT-4, LLAMA-3, BLOOM, PaLM, GPT-3.5, BERT, Gemini, LaMDA, Perplexity, or Falcon. Additionally, or alternatively, one or more of the AI or ML models may also include multiple intelligence models and therefore may be configured to perform and/or execute multiple processes in parallel. In addition, the AI or ML models disclosed may include various artificial intelligence systems or structures, including but not limited to large language models (LLMs), deep learning models, machine learning models, neural networks (e.g., convolutional neural networks (CNNs), recurrent neural networks (RNNs), transformers), expert systems, decision trees, and reinforcement learning models.

Additionally, or alternatively, one or more of the AI/ML models may also include multiple intelligence models (e.g., separately trained intelligence models) and therefore may be configured to perform and/or execute multiple processes in parallel. In some embodiments, the intelligence server 138 may include a special chipset for processing large amounts of data and/or complex computing operations in a reduced amount of time. These chipsets may include, but are not limited to, Graphics Processing Units (GPUs), Tensor Processing Units (TPUs), Field-Programmable Gate Arrays (FPGAs), Application-Specific Integrated Circuits (ASICs) specifically designed for artificial intelligence (AI) workloads, or neuromorphic chips. Such chipsets can be configured to have parallel computing architectures, enabling efficient execution of matrix multiplications and convolutions, which comprise computing operations in a given intelligence model, particularly deep learning models. This parallel processing capability can allow for rapid ingestion, analysis, and processing of vast datasets, thereby accelerating model training, inference, and overall performance of the intelligence server 138 and/or analytics server system 105. The chipsets referenced herein may further incorporate dedicated memory architectures (e.g., High Bandwidth Memory (HBM)) optimized for the data throughput requirements of large intelligence models.

In some embodiments, the intelligence unit 140, or components thereof, may be implemented and/or deployed on dedicated hardware accelerators embedded within a system-on-chip (SoC) or as discrete integrated circuits. These hardware implementations can facilitate high-speed data processing and low-latency inference, needed for real-time applications such analyzing captured substantially real-time data. Furthermore, the intelligence server 138, or components thereof, including specialized chipsets and intelligence models, may be provided by a third-party vendor or service provider (e.g., via cloud-based AI/ML platforms) or may be developed and maintained in-house.

Once captured by the one or more sensors, the substantially real-time data may be transmitted to the analytics server system 105 and/or to the intelligence server 138 for processing. The analytics server system 105, acting as a central hub, can orchestrate the analysis of the data, while the intelligence server, powered by advanced AI and ML computing processes, performs the computationally intensive tasks. For example, the disclosed network system 100 might use a deep learning model of the intelligence server 138 to perform object detection on image data, identifying and classifying various objects in real-time. It could then employ a separate computing process to analyze the movement and behavior objects, recognizing complex interactions or anomalies. In some cases, the intelligence server 138 may combine data from multiple sensors 110 and can fuse a thermal image with a visual one to more accurately identify an object or use LiDAR data to provide precise spatial context to a 2D image. This integrated approach allows the network system 100 to extract a more comprehensive and nuanced understanding of the scene than would be possible with a single processing method, enabling a wide range of applications from security and surveillance to autonomous navigation and environmental monitoring.

It is appreciated that the one or more sensors 110 can comprise one or more visual sensors, audio sensors, touch sensors, radar sensors, LiDAR sensors, GPS sensors, vehicle telemetry sensors, specialized weather sensors, heat or thermal imaging sensors, 3D imaging sensors, AR sensors, VR sensors, and/or chemical sensors.

In some embodiments, the one or more sensors 110 can comprise visual sensors. These sensors may include any device or system capable of capturing, detecting, or measuring visual information from a monitored field. These devices or systems may include cameras, Closed-Circuit Television (CCTV) systems, imaging systems associated with or coupled to an unmanned aerial vehicle (UAV), emotion-optimized cameras, photodetectors, image sensors, satellite imaging sensors, and/or other optical devices. For example, the visual sensors may be configured to acquire visual data, which enables the identification, analysis, and monitoring of objects and environments in real time.

Furthermore, the one or more visual sensors may work with, or have integrated within their hardware setup, various illumination systems to optimize data capture, extending the one or more visual sensors capabilities far beyond standard daylight conditions. These illumination systems, which can be positioned proximally (e.g., a built-in flash on a camera) or distal (e.g., a high-powered floodlight or infrared emitter), work in tandem with the one or more visual sensors to improve the quality and utility of the acquired visual data.

The illumination systems referenced herein can encompass a wide range of technologies, each serving a specific purpose. For visible light imaging, active illumination like high-intensity LEDs or floodlights can be used to brighten a scene, ensuring clear and well-exposed images even in low-light conditions. These systems can be static or dynamic, adjusting their intensity based on the ambient light or focusing on a specific area of interest. For example, a streetlamp-style distal illuminator can provide broad coverage for a public space, while a proximal illuminator on a camera can provide a burst of light for a quick snapshot.

Expanding beyond the visible spectrum, the one or more visual sensors can have attendant infrared (IR) illumination systems, which are crucial for night vision and covert surveillance. These systems can emit IR light, which is invisible to the human eye but detectable by IR-sensitive cameras. This allows the one or more visual sensors to capture detailed images in complete darkness without alerting an imaged object (e.g., a vehicle) in the visual data to its presence. For example, these sensors can be configured for security applications or wildlife monitoring.

Furthermore, the one or more sensors 110 can incorporate other advanced illumination and sensing techniques. Thermal imaging sensors can be used in conjunction with the one or more visual sensors that highlight heat signatures, allowing for the detection of an object (e.g., a vehicle) even through smoke, fog, or camouflage. In some cases, thermal imaging sensors can beneficially enable search and rescue operations or identifying objects (e.g., a vehicle) in a chaotic environment.

In some instances, the one or more sensors 110 can comprise audio sensors. These sensors may include any device or system capable of detecting, capturing, or measuring sound waves or acoustic signals within a monitored environment. These devices or systems may include one or more of microphones, acoustic transducers, acoustic sensors, and/or ultrasonic detectors. For example, the sensors may be configured to identify, classify, and/or analyze sounds associated with objects, vehicles, and/or environmental conditions, and may be deployed in static or dynamic configurations to support a wide range of applications, including monitoring, diagnostics, and situational awareness.

In some embodiments, the one or more sensors 110 may comprise touch sensors. These sensors may include any device or system capable of measuring physical contact, pressure, or tactile input within a monitored environment. These devices or systems may incorporate one or more of capacitive, resistive, piezoelectric, and/or mechanical sensing elements. For example, touch sensors may be configured to detect and analyze physical interactions (e.g., a driver's hands on a steering wheel), which enhances monitoring, control, and operational diagnostics. It is appreciated that a touch sensor may comprise a privacy preserving floor sensor.

In some cases, the one or more sensors 110 may comprise radar sensors. These sensors may include any device capable of emitting electromagnetic waves and detecting their reflections to determine the presence, distance, speed, or movement of objects within a monitored area. These sensors may operate across various frequency bands and may be used for object detection, collision avoidance, or environmental mapping in both static and dynamic scenarios. Like the thermal imaging sensors above, radar sensors are especially useful in identifying an object in a chaotic environment.

In some embodiments, the one or more sensors 110 may comprise light detection and ranging, or LiDAR, sensors. These sensors may include any device configured to emit laser pulses and measure the reflected signals to generate spatial data, such as distance, shape, or surface characteristics of objects. LiDAR sensors may be utilized for three-dimensional mapping, object recognition, or environmental analysis, and may be deployed in fixed or mobile configurations. In some cases, LiDAR sensors beneficially provide precise spatial measurements and three-dimensional mapping (e.g., the curvature of a road), which are essential for object recognition and environmental analysis.

In some instances, the one or more sensors 110 may comprise global positioning system, or GPS, sensors. These sensors may include any device capable of receiving signals from global positioning satellites to determine geographic location, velocity, or timing information. Such devices may be integrated within vehicles or other platforms to provide real-time positioning data for navigation, tracking, or operational analysis. For example, the GPS sensors may be configured to determine an object's location (e.g., the location of a vehicle on a road).

In some cases, the one or more sensors 110 may comprise vehicle telemetry sensors. These sensors may include any device or system configured to monitor, record, or transmit data related to vehicle operation, performance, or status. This may include sensors for speed, acceleration, or braking (e.g., accelerometer), engine parameters, fuel consumption, or other operational metrics, and may support remote or local data acquisition. In some cases, the vehicle telemetry sensors may beneficially enable monitoring and transmitting data about a vehicle's proximity and relationship to other objects (e.g., another vehicle).

In some embodiments, the one or more sensors 110 may comprise specialized weather sensors. These sensors may include any device designed to detect, measure, or monitor environmental conditions such as temperature, humidity, precipitation, wind speed, atmospheric pressure, or other weather-related parameters. For example, specialized weather sensors may be configured to enhance situational awareness or inform operational decisions within the network system 100.

In some instances, the one or more sensors 110 may comprise heat or thermal imaging sensors. These sensors may include any device capable of detecting or measuring thermal energy or temperature variations within a monitored area. These sensors may utilize infrared, thermocouple, or other technologies to identify heat signatures, support object detection, or enable other types of environmental monitoring under various conditions.

In some cases, the one or more sensors 110 may comprise 3D imaging sensors. These sensors may include any device or system capable of capturing three-dimensional spatial data, including but not limited to stereoscopic cameras, structured light sensors, or time-of-flight sensors. In some cases, the 3D imaging sensors beneficially enable mapping of three-dimensional spaces (e.g., the curvature of a road), enabling advanced recognition, reconstruction, and analysis of objects and scenes.

In some embodiments, the one or more sensors 110 may comprise augmented reality (AR) sensors. These sensors may include any device or system capable of capturing, detecting, or measuring data that enables the overlay of digital information onto a physical environment. These devices or systems may comprise cameras, depth sensors, inertial measurement units (IMUs), and environmental sensors.

In some instances, the one or more sensors 110 may comprise virtual reality (VR) sensors. These sensors may include any device or system capable of capturing, detecting, or measuring data that enables the creation or manipulation of immersive digital environments. These devices or systems may comprise motion tracking sensors, gyroscopes, accelerometers, haptic feedback devices, and spatial mapping sensors. For example, the virtual reality sensors may be configured for monitoring user movements, gestures, and interactions.

In some cases, the one or more sensors 110 may comprise chemical sensors. These sensors may include any device or system capable of detecting, capturing, or measuring the presence, concentration, or composition of chemical substances within a monitored environment. These devices or systems may comprise smoke, electrochemical, optical, semiconductor, gas, and biological sensors. For example, the chemical sensors may be configured for detecting and analyzing chemical substances in an event venue or on a public road.

The different embodiments of the one or more sensors 110 disclosed herein are exemplary embodiments only.

The raw data from the one or more sensors 110 can comprise a substantially real-time data and may be subjected to a series of data conditioning including sophisticated signal processing and image optimization operations within the analytics server system 105 and/or the intelligence server 138. This step beneficially refines the raw data before it is analyzed.

A relevant process comprised in the data conditioning is noise reduction, which filters out random fluctuations in the raw data caused by, for example, low light or high sensor gain. Computing processes such as spatial and temporal filtering can be applied to create a cleaner image with less grain, improving the accuracy of subsequent AI and ML operations. For visual data captured with IR illumination, specialized algorithms can enhance the contrast and detail of heat signatures, making it easier to classify and identify objects.

In addition, the data conditioning phase may employ advanced computational photography techniques. This can include High Dynamic Range (HDR) imaging, where multiple images of a given scene (e.g., a captured view by the one or more sensors 110) are captured at different exposures and then combined to create a single image with detail in both the brightest and darkest areas. Additionally, image stitching can be used to combine multiple images from different sensors comprised in the one or more sensors into a single, comprehensive view of the scene, providing a wider field of view. The intelligence server 138 can also apply real-time image enhancement and sharpening filters to make the raw data more suitable for specific analytical tasks, such as facial recognition or object tracking, ensuring that every piece of data is optimized for its intended purpose.

The operational nature of the sensors 110 may vary, encompassing static and dynamic implementations. In some embodiments, the sensors 110 may be static, fitted to a fixed structure and secured to prevent any movement, such as a sensor permanently bolted to an elongated frame to monitor a given area on a roadway. Other static sensors may be fitted to a fixed structure but secured in a way that allows for movement. One such sensor may be a pan-tilt-zoom (PTZ) camera mounted on the exterior of a given area that can be remotely controlled to observe various angles of said area or follow objects of interest. In further embodiments, the sensors 110 may be dynamic, fitted to moving platforms or vehicles. Examples of such dynamic sensors include those mounted on unmanned aerial vehicles (drones), inspection sensors affixed to autonomous delivery robots or other vehicles in a given location, or sensors integrated into vehicles.

In an exemplary implementation, the one or more sensors 110 (e.g., image capture sensors) comprise synchronized or unsynchronized cameras with or without an overlapping field of view. For example, the synchronized or unsynchronized cameras may be configured to monitor an area of a roadway including or excluding a lane of the roadway that is divided into n-regions with each region being monitored by one or more synchronized or unsynchronized cameras. Furthermore, each of the synchronized or unsynchronized cameras can comprise a high-angle camera configured to provide a clear view of an object (e.g., a vehicle) in its field of view such that images of the object can be analyzed from an optimal perspective. In addition, the disclosed one or more sensors 110 may be configured to implement occlusion mitigation computing operations that correct, compensate, or mitigate against negative effects of undesirable objects blocking the field of view of said one or more sensors.

It is appreciated that the one or more endpoint devices 125*a* . . . 125*n* can comprise handheld computing devices, smart phones, tablets, phablets, laptop computers, desktop computers, personal digital assistants (PDAs), smart devices, wearable electronic devices, biometric devices, computer servers, virtual servers, virtual machines, and/or communication servers. In some embodiments, the one or more endpoint devices 125*a* . . . 125*n* may include a plurality of computing devices configured to communicate with one another and/or receive/transmit data communications from/to the analytics server system 105 and/or the intelligence server 138. In some instances, one or more alert data communications (e.g., the aforementioned alerts) associated with executing one or more of the disclosed methods may be visualized on one or more display devices of the one or more endpoint devices 125*a* . . . 125*n*. In some cases, the one or more endpoint devices comprise a first endpoint device that is associated with the analytics server system 105. This first endpoint device, for example, can comprise an admin endpoint device configured to monitor, control, or otherwise regulate or validate various computing operations implemented in the network system 100. Furthermore, the one or more endpoint devices 125*a* . . . 125*n* can include a second endpoint device that may be dependent or independent from the analytics server system 105. This second endpoint point device, for example, may be associated with a security or monitoring system configured to support or implement security operations or vehicular traffic management based on analyzing captured image data. It is also appreciated that the one or more endpoint devices 125*a* . . . 125*n* may include and/or are associated with the one or more sensors 110.

The output system 120 of FIG. 1, is adaptable to interface with, and drive one or more sensor interfaces using data or control logic that may be either dependent on or independent of the computing operations performed by the disclosed methods and systems. For example, the output system 120 may incorporate a visual subsystem, such as a graphical display device including but not limited to liquid crystal displays (LCDs), light-emitting diode (LED) displays, organic light-emitting diode (OLED) displays, or touch-screen interfaces, configured to render data alerts, notifications, graphical representations, or other electronic indicia derived from or responsive to the outcomes of the disclosed computing operations. Additionally, the output system 120 may integrate an audio subsystem, exemplified by speakers, transducers, or audio amplifiers, capable of generating audio data such as tones, voice prompts, or synthesized speech in response to input data or control logic stemming from, or independent of the disclosed methods. Furthermore, the output system 120 can encompass vibration-based mechanisms, such as eccentric rotating mass (ERM) motors or linear resonant actuators (LRAs), embedded within various apparatuses including automotive steering wheels, handheld mobile computing devices, wearable electronic watches, or tablet computing devices, to deliver tactile alerts or feedback patterns triggered by processed data or logic resulting from one or more of the disclosed methods.

In some embodiments, the output system 120 is configured to activate a haptic feedback subsystem, employing vibration sensors, piezoelectric elements, or similar haptic actuators to provide nuanced tactile sensations, such as variable intensity vibrations or directional cues, in response to data or control logic generated post-execution of one or more of disclosed methods. Moreover, the output system 120 may include embedded control logic designed to regulate environmental conditioning systems, thereby modulating parameters like ambient temperature via heating or cooling elements, atmospheric pressure through pressurization valves or compressors, or humidity levels using humidifiers, dehumidifiers, or evaporative systems, all in accordance with the computational results or directives associated with the disclosed methods and systems. Additionally, the output system 120 can incorporate control logic for operating a radio transmitter, facilitating the transmission of electrical or electromagnetic data—such as processed sensor readings, analytical insights, or command signals—to key interconnected systems depicted in FIG. 1, including but not limited to the analytics server 105, the intelligence server 138, and the endpoint devices 125*a* . . . 125*n* via protocols such as Wi-Fi, Bluetooth, cellular networks, or other wireless and/or wired communication standards.

In some embodiments, the output system 120 may be comprised in, or associated with one or more of the analytics server 105, the intelligence server 138, and the endpoint devices 125*a* . . . 125*n*. In some cases the output system 120 is proximal to one or more of analytics server 105, the intelligence server 138, and the endpoint devices 125*a* . . . 125*n*. For example, the output system may be comprised in, for example, a vehicle associated with the analytics server 105, the intelligence server 138, and the endpoint devices 125*a* . . . 125*n*.

System Environment

FIGS. 2 and 3 illustrate exemplary system and functional diagrams of a computing environment 200, within which one or more systems shown in FIG. 1 can be implemented. Specifically, FIG. 2 provides a system diagram of the computing environment, whereas FIG. 3 provides a detailed functional diagram of the computing environment 200.

The computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other and to the network 115 of FIG. 1. The computing environment 200 may be implemented on general-purpose hardware and/or specifically-purposed hardware as the case may require.

The processing unit 202 may control one or more of the memory unit(s) 204, the I/O unit 206, and the communication unit 208 of the computing environment 200, as well as any included subunits, elements, components, devices, and/or functions performed by the memory unit 204, I/O unit 206, and the communication unit 208. The described subelements of the computing environment 200 may also be included in similar fashion in any of the other units and/or devices included in the network system 100 of FIG. 1. Additionally, any actions described as being performed by a processor may be executed by the processing unit 202 of FIG. 2 alone and/or by the processing unit 202 in conjunction with one or more additional processors, units, subunits, elements, components, devices, and/or the like. For example, the processing unit 202 may be configured to implement computing instructions that process or otherwise analyze received image, video, or other data from the one or more sensors discussed above.

Further, while one processing unit 202 may be shown in FIG. 2, multiple processing units may be present and/or otherwise included in the computing environment 200 or elsewhere in the network system 100 of FIG. 1. Thus, while instructions may be described as being executed by the processing unit 202 (and/or various subunits of the processing unit 202), the instructions may be executed simultaneously, serially, and/or otherwise by one or multiple processing units 202 on one or more computing devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, media content, image content, video content, textual content, audio-visual content, or any combination thereof. In some instances, content on which the content management unit 212 may operate includes device information, user interface data, images, text, themes, audio files, video files, documents, and/or the like. Additionally, the content management unit 212 may control (e.g., format) the audio-visual environment and/or appearance of application data during execution of various processes. In some embodiments, the content management unit 212 may interface with a third-party content server and/or memory location for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information. The location determination unit 214 may be associated with the one or more sensors 110, discussed above.

The GPU 216 may facilitate generation, modification, analysis, processing, transmission, and/or presentation of content described above, as well as any data such as pipeline data or analysis data or other output data generated using at least a file and/or the like. In some embodiments, the GPU 216 may be used to render content for presentation on a computing device via, for example, a graphical display device or a graphical user interface (GUI) of a display device of the endpoint device 125*a*. The GPU 216 may also include multiple GPUs and therefore may be configured to perform and/or execute multiple processes in parallel.

The resource allocation unit 218 may facilitate the determination, monitoring, analysis, and/or allocation of computing resources throughout the computing environment 200 and/or other computing environments. For example, the computing environment may facilitate a high volume of data to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may use computing resources of a second computing environment separate and distinct from the computing environment 200 to facilitate a desired operation. For example, the resource allocation unit 218 may determine a number of simultaneous computing processes and/or requests. The resource allocation unit 218 may also determine that the number of simultaneous computing processes and/or requests meet and/or exceed a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

The memory unit 204 may be used for storing, recalling, receiving, transmitting, and/or accessing various files and/or data during operations within the computing environment 200. In one embodiment, the memory unit 204 stores instructions, code, and/or data that may be executed by the processing unit 202. For instance, the memory unit 204 may store code that execute operations associated with one or more units and/or one or more subunits of the computing environment 200. For example, the memory unit may store code for the processing unit 202, the I/O unit 206, the communication unit 208, and for itself. Moreover, the memory unit may store code for implementing the data unit 136 associated with the analytics server system 105. Furthermore, the memory unit 204 can also be used to store one or more computing models, relationship record(s) associated with category data determined during, for example, classification computing operations executed on a captured substantially real-time data using the one or more sensors. The category data, for example, can be linked to, or characterize features of objects imaged using the one or more sensors.

Turning back to FIGS. 2 and 3, the memory unit 204 may include various types of data storage media such as solid-state storage media, hard disk storage media, virtual storage media, and/or the like. Memory unit 204 may include dedicated hardware elements such as hard drives and/or servers, as well as software elements such as cloud-based storage drives. In some implementations, memory unit 204 may include a random-access memory (RAM) device, a dynamic random-access memory (DRAM) device, a static random-access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described in this disclosure. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 includes one or more databases 210 for storing any data described herein. For example, depending on the implementation, the one or more databases 210 may be used as the local computing database 111*a* or remote computing database 111*b* associated with the analytics server system 105. In some embodiments, the memory unit 204 and/or its subunits may be local relative to the analytics server system 105 and/or be remotely located relative to the analytics server system 105.

The memory unit 204 may include subunits such as an operating system unit 226, an application data unit 228, an application programming interface (API) unit 230, a content storage unit 232, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described. For instance, the memory unit 204 may include the data unit 136 and the intelligence unit 140. The data unit 136 and/or intelligence unit 140 may be configured to implement one or more of the disclosed computing methods or operations. According to one embodiment, the data unit 136 and/or the intelligence unit 140 comprise one or more of a analytic data flux processor (ADFP), a cognitive data orchestration unit (CDOU), an insight generation hypervisor (IGH), a metric derivation computational fabric (MDCF), a phenomenological data synthesizer (PDS), a quantitative intelligence abstraction engine (QIAE), an adaptive data analytics core (ADAC), a contextual insight graph engine (CIGE), an empirical data transformation array (EDTA), or a heuristic data pattern extractor (HDPE).

The operating system unit 226 may facilitate deployment, storage, access, execution, and/or utilization of an operating system used by computing environment 200 and/or any other computing environment described in this disclosure. In some embodiments, operating system unit 226 may include various hardware and/or software elements that serve as a structural platform for the processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application used by computing environment 200 and/or any other computing environment described herein. For example, an endpoint device (e.g., endpoint device 125*a*) may be required to download, install, access, and/or otherwise use a software application (e.g., web application) to facilitate performance of one or more of the disclosed computing operations. As such, application data unit 228 may store any information and/or data associated with an application. Application data unit 228 may further store various pieces of information and/or data associated with the operation of an application and/or computing environment 200 as a whole, such as a status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or use of information associated with APIs of computing environment 200 and/or any other computing environment described in this disclosure. For example, computing environment 200 may include one or more APIs for various devices, applications, units, subunits, elements, and/or other computing environments to communicate with each other and/or use the same data. Accordingly, API unit 230 may include API databases containing information that may be accessed and/or used by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the analytics server system 105 and/or the display device of the endpoint device 125*a* to communicate with each other.

The content storage unit 232 may facilitate deployment, storage, access, and/or utilization of information associated with performance of the disclosed operations by computing environment 200 and/or any other computing environment described. In some embodiments, content storage unit 232 may communicate with content management unit 212 to receive and/or transmit content files (e.g., media content, image data, video data, audio-visual data, visualization data, etc.).

The cache storage unit 240 may facilitate short-term deployment, storage, access, analysis, and/or use of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing processes described herein. For example, elements of the I/O unit 206 may be used to receive input from the analytics server system 105. As described, I/O unit 206 may include subunits such as an I/O device 242, an I/O calibration unit 244, and/or driver 246.

The I/O device 242 may facilitate receipt, transmission, processing, presentation, display, input, and/or output of information as a result of executed processes described in this disclosure. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally, and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute the disclosed operations.

The I/O calibration unit 244 may facilitate the calibration of the I/O device 242. For example, I/O calibration unit 244 may detect and/or determine one or more settings of I/O device 242 and then adjust and/or modify settings and/or format and/or optimize viewing of a graphical user interface and/or one or more visualizations associated with alerts or alert data communications. According to some embodiments, the I/O calibration unit 244 may be used to format or resolve, for example, data communications such as alerts or data reports into multidimensional data components (e.g., multi-modal data including multiple aspects such as image data, video data, textual data, etc.) and rendering the multidimensional data components on a display device.

In some embodiments, the I/O calibration unit 244 may use a driver 246 (or multiple drivers) to calibrate I/O device 242. For example, driver 246 may include software that is installed by I/O calibration unit 244 so that an element of computing environment 200 (or an element of another computing environment) may recognize and/or integrate with I/O device 242 for disclosed processes.

The communication unit 208 may facilitate establishment, maintenance, monitoring, and/or termination of data communications (e.g., control or alert data communications) between computing environment 200 and other computing environments, third party server systems, and/or the like. Communication unit 208 may also facilitate internal communications between various elements (e.g., units and/or subunits) of computing environment 200. For example, the communication unit 208 may be configured to receive substantially real-time data from one or more of the one or more sensors 110 as well as coordinate the transmission and/or storage of any attendant data such as analysis reports associated with analyzing the substantially real-time data, instructions and/or data to the one or more output system 120, and/or any alerts to stakeholders with one or more endpoint devices. In some embodiments, communication unit 208 may include a network protocol unit 248, an API gateway 250, an encryption unit 252, and/or a communication device 254. Communication unit 208 may include hardware and/or software elements.

The network protocol unit 248 may facilitate establishment, maintenance, and/or termination of a communication connection for computing environment 200 by way of a network. For example, the network protocol unit 248 may detect and/or define a communication protocol required by a particular network and/or network type. Communication protocols used by the network protocol unit 248 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for computing environment 200 may include transforming and/or translating data from being compatible with a first communication protocol to being compatible with a second communication protocol. In some embodiments, network protocol unit 248 may determine and/or monitor an amount of data traffic to consequently determine which particular network protocol is to be used for establishing a secure communication connection, transmitting data, and/or performing the disclosed methods and/or data visualization operations and/or other processes provided in this disclosure.

The API gateway 250 may allow other devices and/or computing environments to access API unit 230 of memory unit 204 of computing environment 200. For example, display devices associated with the various systems of FIG. 1 may access API unit 230 of computing environment 200 via API gateway 250. In some embodiments, API gateway 250 may be required to validate user credentials associated with a user of a display device prior to providing access to API unit 230 to a user. API gateway 250 may include instructions for computing environment 200 to communicate with another device and/or between elements of the computing environment 200.

The encryption unit 252 may facilitate translation, encryption, encoding, decryption, and/or decoding of information received, transmitted, and/or stored by the computing environment 200. Using encryption unit 252, each transmission of data may be encrypted, encoded, and/or translated for security reasons, and any received data may be encrypted, encoded, and/or translated prior to its processing and/or storage. In some embodiments, encryption unit 252 may generate an encryption key, an encoding key, a translation key, and/or the like, which may be transmitted along with any data content.

The communication device 254 may include a variety of hardware and/or software specifically purposed to facilitate communication for computing environment 200. In some embodiments, communication device 254 may include one or more radio transceivers, chips, analog front end (AFE) units, antennas, processing units, memory, other logic, and/or other components to implement communication protocols (wired or wireless) and related functionality for facilitating communication for computing environment 200. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Figure 4:
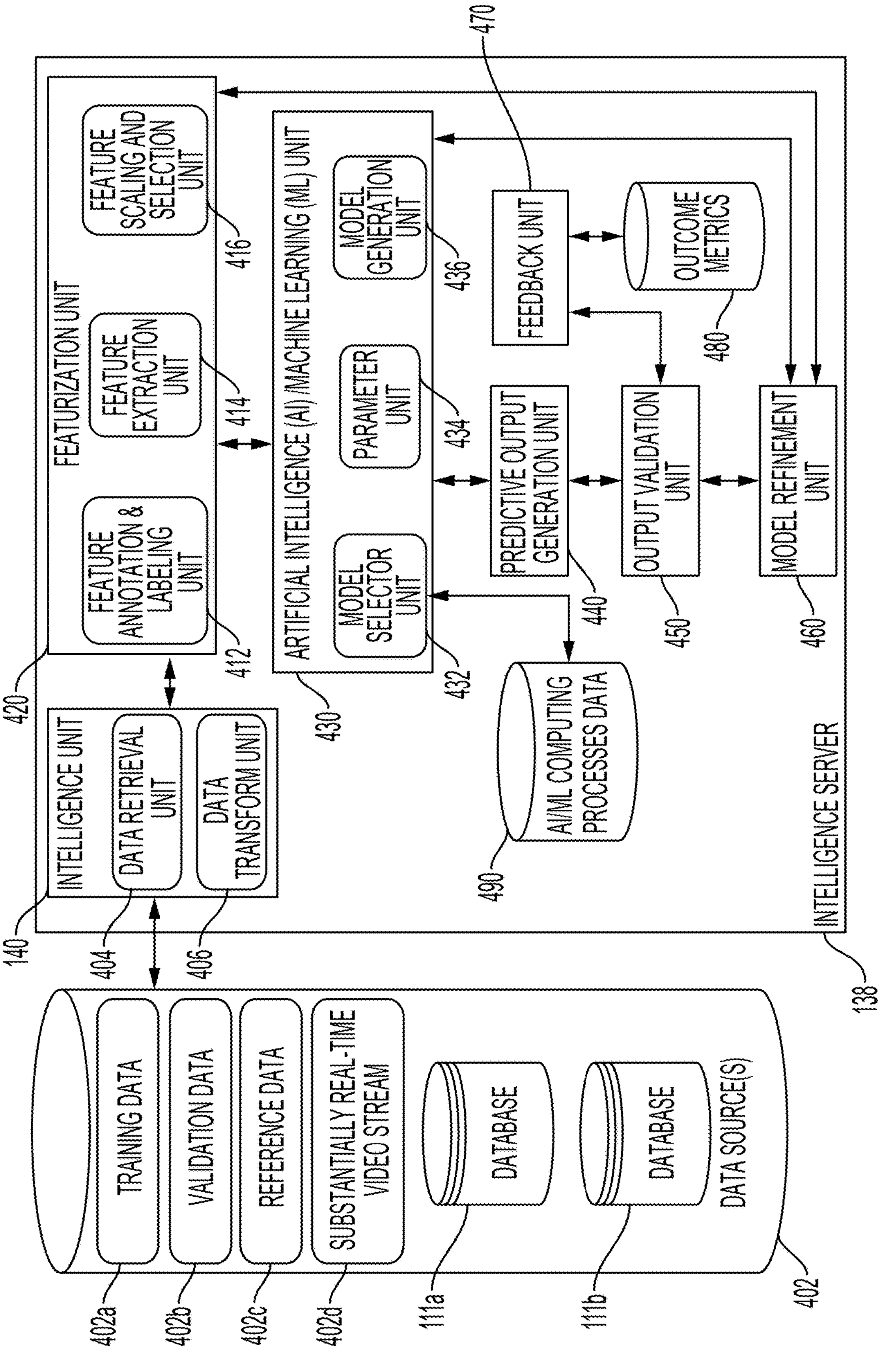
FIG. 4 shows an exemplary communicative coupling of the intelligence server 138 to one or more data sources.

FIG. 4 shows an exemplary communicative coupling of the intelligence server 138 to one or more data sources. In the illustrated implementation, the intelligence server 138 comprises the above-referenced intelligence unit 140 that can include a data retrieval unit 404 and data transform unit 406. Data retrieval unit 404 may be configured to access, assess, interpret, request, or receive data, which may be adjusted, reformatted, or changed. For example, data retrieval unit 404 may request data from a remote source (e.g., data from the one or more sensors 110 and/or databases 111*a* and 111*b* of the analytics server system 105) using an API. Thus, the intelligence unit 140 may be configured to access, interpret, request, format, re-format, or receive input data from the one or more data sources outlined in data source(s) 402. For example, intelligence unit 140 may be configured to use data transform unit 406 to execute a re-configuration or other data changes or data transformations, such as a data dimension reduction prior to the analytics server 105 running intelligence computing operations on said transformed data. Data source(s) 402 may comprise real-time or near real-time captured data that is stored on one or more memories devices such as those discussed in association with FIGS. 2 and 3. In some embodiments, data source(s) 402 may be associated with a single entity (e.g., a single computing network) or with multiple entities (e.g., multiple computing networks). Data source(s) 402 may include one or more of training data 402*a* (e.g., input data to feed a machine learning model as part of one or more training processes), validation data 402*b* (e.g., data against which at least one processor may compare model output with, such as to determine model output quality), reference data 402*c*, and/or a substantially real-time video stream 402*d*. In some embodiments, intelligence unit 140 can be implemented using at least one computing device. For example, data from data sources 402 can be obtained through one or more I/O devices and/or network interfaces. Further, the received data may be stored (e.g., during execution of one or more operations) in a suitable storage or system memory. Intelligence unit 140 may also be configured to interact with a memory unit (e.g., memory unit 204), which may be implemented on a computing device that stores data in a storage device.

In some embodiments, intelligence unit 140 comprises an executable software module containing one or more instructions or computer-executable logic. These instructions are specifically configured to be executed by one or more processors, such as the processors discussed in association with FIGS. 2 and 3, to perform computing operations of the intelligence server 138 including coordinating with the various units of the intelligence server 138 to perform intelligent computing operations.

The intelligence server 138 may also include machine learning (ML) modeling unit 430, which may be configured to execute one or more modeling computing operations on an AI or ML model (e.g., model training, model re-configuration, model validation, model testing), such as those described in the processes described herein. For example, the ML modeling unit 430 may execute an operation to train an AI or ML model, such as adding, removing, or modifying a model parameter. Training of an AI or ML model may be supervised, semi-supervised, or unsupervised. In some embodiments, training of an AI or ML model may include multiple epochs, or passes of data (e.g., training data 402*a*) through an AI or ML model process (e.g., a training process). In some embodiments, different epochs may have different degrees of supervision (e.g., supervised, semi-supervised, or unsupervised).

Training data for a given AI or ML model under consideration may include input data (e.g., as described above) and/or data previously output from a model (e.g., forming recursive learning feedback). A model parameter may include one or more of a seed value, a model node, a model layer, a computing process, a function, a model connection (e.g., between other model parameters or between models), a model constraint, or any other digital component influencing the output of a model. A model connection may include or represent a relationship between model parameters and/or disparate models, which may be dependent or interdependent, hierarchical, and/or static or dynamic. The combination and configuration of the model parameters and relationships between model parameters discussed herein can be cognitively infeasible for the human mind to maintain or use. Without limiting the disclosed embodiments in any way, an ML or AI model may include millions, trillions, or even billions of model parameters.

ML modeling unit 430 may include model selector unit 432 (e.g., configured to select a model from among a plurality of models, such as based on input data), parameter selector unit 434 (e.g., configured to add, remove, and/or change one or more parameters of a model), and/or model generation unit 436 (e.g., configured to generate one or more machine learning models, such as according to model input data, model output data, comparison data, and/or validation data). In some embodiments, model selector unit 432 may be configured to receive input and/or transmit output to AI/ML computing processes database 490. AI/ML computing processes database 490 may store one or more AI/ML models, any of which may be fully trained, partially trained, or untrained. In one embodiment, an AI/ML model may be, or include, without limitation, one or more of (e.g., such as in the case of a metamodel) a statistical model, a complex computing process, a neural network (NN), a convolutional neural network (CNN), a generative neural network (GNN), a Word2Vec model, a bag of words model, a term frequency-inverse document frequency model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, a You Only Look Once (YOLO) computing model. A YOLO model, for example, can be used to efficiently detect and bound an object within the image data using, for example, a bounding box. Further, each of the bounding boxes for a detected object may comprise minimum coordinates and maximum coordinates. The minimum and maximum coordinates can represent the coordinates of two diagonally opposite corners of a given bounding box. In one embodiment, the minimum coordinates can correspond to the top-left corner of the bounding box, while the maximum coordinates correspond to the bottom-right corner of the bounding box. Furthermore, the intelligence server 138 may be configured to measure the relative angle between the two bounding boxes associated with a given image data and thereby track the movement of the vehicles on a roadway. The relative angle may be generated using a straight line connecting either the minimum coordinates or the maximum coordinates of the two bounding boxes.

By processing images in real-time using the disclosed models, the disclosed system becomes a high-accuracy vehicle detection system, making it suitable for applications such as real-time traffic monitoring. Other intelligent computing processes such as SSD (Single Shot MultiBox Detector) computing processes, Faster R-CNN computing processes, RetinaNet computing processes, and the like can be employed for the vehicles detection and bounding, to efficiently track the movement of the vehicles on the roadway.

Intelligence server 138 can further include predictive output generation unit 440, output validation unit 450 (e.g., configured to apply validation data to machine learning model output), feedback unit 470 (e.g., configured to apply feedback to a model), and model refinement unit 460 (e.g., configured to update or re-configure a model). In some embodiments, feedback unit 470 may receive input and/or transmit output (e.g., output from a trained, partially trained, or untrained model) to outcome metrics database 480. Outcome metrics database 480 may be configured to store output from one or more models and may also be configured to associate output with one or more models. In some embodiments, outcome metrics database 480, or other device (e.g., model refinement unit 460 or feedback unit 470) may be configured to correlate output, detect trends in output data, and/or infer a change to input or model parameters to cause a particular model output or type of model output. In some embodiments, model refinement unit 460 may receive output from predictive output generation unit 440 or output validation unit 450. In some embodiments, model refinement unit 460 may transmit the received output to featurization unit 420 or ML modeling unit 430 in one or more iterative cycles. The featurization unit 420 may comprise at least one of a feature annotation and labeling unit 412, a feature extraction unit 414, or a feature scaling and selection unit 416.

Any or each unit of intelligence server 138 may comprise a computing unit or a data unit, which may be a packaged functional hardware unit designed for use with other components or a part of a program that implements specific computing operations. Any or each computing unit may be implemented using a computing environment such as those discussed in conjunction with FIGS. 2 and 3. In some embodiments, the functionality of intelligence server 138 may be split across multiple computing environments to allow for distributed processing of the data, which may improve output speed and reduce computational load on individual computing environments. In some embodiments, intelligence server 138 may use load-balancing to maintain stable resource loads (e.g., processing load, memory load, or bandwidth load) across multiple computing environments and to reduce the risk of a computing environment from becoming overloaded. In these or other embodiments, the different components may communicate over one or more I/O devices and/or network interfaces.

It is appreciated that the intelligence server 138 can beneficially facilitate implementing one or more computing operations associated with the network system 100 of FIG. 1. In effect, the intelligence server 138 provides the computational backbone for complex, single, or multi-stage intelligence computing processes. It is appreciated that the intelligence server 138 can ingest a substantially real-time data from multiple sensors which can be used in an object detection, and/or establishing data indicative of proximity and contact dynamics assessment between two objects (e.g., two vehicles), where an AI model of the intelligence server 138, identifies and draws a bounding box (e.g., a structure that can surround an object in an image) around each object (e.g., vehicles) comprised in the captured substantially real-time data. Following detection, the intelligence server 138 may perform various computing operations to classify consistent identifiers to each identified object in the substantially real-time data across successive image frames within a single view of one or more sensors 110. This addresses challenges like temporary occlusion, where an object is briefly hidden from view. The intelligence server 138's processing power and architecture enables these computationally intensive tasks to happen quickly and accurately, allowing for the classification and identification of objects on a roadway.

In some embodiments, the intelligence server 138 can analyze the spatial and temporal (e.g., spatiotemporal) relationships between an identified object (e.g., a vehicle) and other objects comprised in the data components of the substantially real-time data. This can involve a deeper layer of AI and/or ML computing operations to infer the nature of the object relationships in the image data. For example, if the intelligence server 138 detects a data object near an object like "a door," "a car," "a house," "a tree," etc., it might use a trained model of the intelligence server 138 to recognize an action of a given data object such as "opening the door," "entering the car," "leaving a house," "climbing the tree," etc. Thus, the intelligence server 138 is not only configured for detecting just data objects. Rather, the intelligence server 138 can be implemented to substantially determine a complete semantic description of an interaction between a given data object and other data objects (e.g., data objects comprising pixel representations of organic or inorganic objects in the real world). This allows the intelligence server 138 to recognize and classify a wide range of actions, providing a nuanced understanding of a camera scene comprised in a substantially real-time video stream by identifying not just what is present in the scene, but also what is happening within the scene. It is appreciated that a first data object, a second data object, a third data object, etc., comprised in the substantially real-time video stream may be classified into first category data, second category data, third category data, etc., by the intelligence server 138.

Embodiments

The disclosed methods and systems are directed to urban intelligence solutions for determining whether a driving environment is speed controlled, alerting vehicle operators if the driving environment is speed-controlled, monitoring the vehicle operator's response and/or the vehicle's change in speed in response to the alert, and generating subsequent alerts if the response is insufficient. The methods and systems may incorporate urban intelligence concepts by realizing features associated with the driving environment, like physical structures and/or pedestrians, and determining whether the vehicle's speed should be adjusted.

The disclosed methods and systems are configured for receiving real-time data associated with a driving environment, determining whether the driving environment is a speed-controlled zone, and initiating an alert to a vehicle operator to reduce the vehicle's speed. For example, the speed-controlled zone may comprise a low-speed zone. The low-speed zone may be a road segment where either reduced speed is legally required and/or contextually advisable for safety. According to one embodiment, the disclosed methods and systems include at least one of the real-time, substantially real-time, and/or near real-time receiving of one or more sensor data. It is appreciated that sensor data may comprise information that can be gathered from a physical environment through the use of the five senses: sight, touch, sound, taste, and smell. For example, sensor data may comprise the sight of facial expressions, the touch of a person walking on a floor, the sound of people shouting, the taste of food, and/or the smell of gasoline fumes. It is also appreciated that sensor data may comprise information that can be gathered from a physical environment through the use of, for example, photodetectors and/or Geiger counters, which detect light outside the visual spectrum.

The one or more sensor data may be received through one or more sensors 110. In one embodiment, the one or more sensors 110 may include one or more advanced driver assistance systems (ADAS). It is appreciated the one or more ADASs may comprise a suite of vehicle-based technologies designed to enhance driver safety. For example, the one or more ADASs may comprise one or more cameras, light detection and ranging sensors, radar sensors, GPS sensors, vehicle telemetry sensors, and/or weather sensors. For example, the one or more cameras may provide high-resolution imaging for one or more visual scene analysis, object detection, road sign recognition, and/or environmental condition assessment. The one or more light detection and ranging sensors may provide 3D point cloud generation for one or more precise distance measurements, object classifications, and/or terrain mappings. The one or more radar sensors may provide for one or more all-weather object detection, speed measurement of surrounding vehicles, and/or obstacle detection. The one or more GPS sensors may comprise enhanced positioning, wherein an object's location may be determined with a high-degree of accuracy and may be correlated with map data. The one or more vehicle telemetry sensors may provide for one or more real-time capture of vehicle speed, acceleration, steering angle, and/or braking patterns. The one or more weather sensors (e.g., specialized weather sensors) may detect one or more environmental conditions including rain, dust, fog, snow, etc. The one or more weather sensors may facilitate an assessment of the driving environment's visibility.

The methods and systems may access one or more intelligence models to process the one or more sensor data. It is appreciated that this process may comprise extracting one or more features associated with the driving environment. In one embodiment, the one or more intelligence models analyze a road. This analysis may comprise using computer vision, which may comprise using AI to interpret and analyze visual data from the driving environment. For example, the one or more intelligence models may perform a road analysis (e.g., calculate the curvature of the road, road bend angles, and/or radii), assess the width of the lanes on the road, and detect intersections associated with the road. In another embodiment, the one or more intelligence models may perform an infrastructure classification for structures near or associated with the road. For example, the one or more intelligence models may identify one or more schools, mosques, hospitals, residential zones, etc. In some cases, the one or more intelligence models may perform a vegetation analysis (e.g., to identify a park and/or trees to predict pedestrian activity). In other embodiments, the one or more intelligence models may perform a vehicle behavior pattern recognition to estimate traffic density and/or recognize vehicle behavior patterns. The data collected from the one or more sensors 110 may be fused, a technique which combines data from multiple sensors to produce more accurate, reliable information than a single sensor can provide.

In some embodiments, the one or more intelligence models may comprise one or more deep learning classification models. It is appreciated that the one or more deep learning classification models may comprise at least one of a convolutional neural network, a recurrent neural network, a transformer system, and/or an ensemble method.

The convolutional neural network (CNN) may be a type of deep learning model well-suited for processing data with a grid-like topology, such as images. It is appreciated that the CNN is useful for visual scene analysis (e.g., identifying road features associated with a driving environment). In some embodiments, the CNN may use convolutional layers to automatically and adaptively learn spatial hierarchies of features from input data (e.g., sensor data). For example, the CNN may be used in image recognition, object detection, and similar tasks because it excels at capturing local patterns and spatial relationships.

The recurrent neural network (RNN) may be designed for sequential data (e.g., time series, text, or speech). It is appreciated that the RNN may be useful for temporal pattern recognition in driving behavior. In some embodiments, the RNN may have connections that form cycles, allowing information to persist and be passed from one step of the sequence to the next. This may make them more effective for tasks where context and order matter (e.g., driving on a road).

The transformer system may utilize self-attention mechanisms to process all elements of a sequence simultaneously, which may enable them to capture long-range dependencies and relationships efficiently. It is appreciated that the transformer system may be useful for fusing the one or more sensor data. It is also appreciated that the transformer system is the foundation for models like BERT, GPT, and others.

The ensemble method may combine multiple machine learning models to improve overall performance, robustness, and accuracy of the driving environment. It is appreciated that the ensemble method may provide for a more robust, low-speed zone classification. In some embodiments, the ensemble method aggregates predictions of several models, which reduces errors and variance. For example, the ensemble method may utilize techniques comprising one or more of bagging, boosting, and/or stacking.

In another embodiment, the one or more intelligence models may comprise one or more contextual reasoning and situation assessment models. For example, the one or more contextual reasoning and situation assessment models may be based on at least one of: a geographical context integration, an environmental condition analysis, and/or an operator behavior profile.

For example, the geographical context integration may consider the relationship between a vehicle and its surrounding geography. In some embodiments, the geographical context integration may comprise at least one of: a correlation with one or more predefined locations, a geofence, and/or traffic data. In some cases, the real-time correlation may suggest and/or require speed reduction (e.g., a real-time correlation between the vehicle and a known road intersection).

In other cases, the geofence may be placed around sensitive areas with a variable radius (e.g., dynamic) based on traffic conditions. In another embodiment, the traffic data may comprise temporal and/or spatial-specific speed recommendations (e.g., historical traffic pattern analysis).

In one embodiment, the environmental condition analysis may consider the relationship between the vehicle and its surrounding environmental conditions. In some embodiments, the environmental condition analysis may be based on at least one of: a weather assessment, a road condition assessment, and/or a visibility assessment. It is appreciated that the weather assessment may be conducted to assess safe driving speeds under current and/or predictive weather conditions.

In some cases, the road condition assessment may be conducted to evaluate vehicle stopping distance (e.g., to determine the condition of the road surface). In other cases, the visibility assessment may be performed to analyze required speed adjustments (e.g., to determine and analyze visibility conditions).

In another embodiment, the operator behavior profile may consider historical and contemporary data associated with the operator's driving habits. In some embodiments, the operator behavior profile may comprise at least one of a driving pattern (e.g., the operator's driving pattern), a response time (e.g., between an alert and the response), and/or a behavioral prediction. For example, the driving pattern may facilitate the one or more intelligence models' learning, adaptation, and/or prediction of necessary alerts by analyzing habits associated with the vehicle operator and/or the operator of one or more vehicles (e.g., other drivers on the road). The driving pattern may comprise data associated with stopping frequency, driving time of day frequency, highway v. city driving frequency, etc. Similarly, the response time may facilitate personalized alert timing and/or analysis. It is appreciated that the behavioral prediction may provide for proactive alerting directed towards a unique operator.

The methods and systems disclosed herein may provide for multimodal alerts associated with a driving environment. It is appreciated that a vehicle operator may, from time to time, need to be alerted to driving conditions which they may not readily appreciate and/or respond. It is also appreciated that different vehicle operators may respond differently to different types and/or intensities of alerts. For example, the alerts may be initiated when the vehicle enters a speed-controlled zone. In some embodiments, the alert may be initiated if the vehicle operator fails to respond to the speed-controlled zone and/or to an earlier alert. It is appreciated that the alert may comprise at least one of a personalized alert, a visual alert, an auditory alert, and/or a haptic alert.

It is appreciated that the personalized alert may be customized to the unique vehicle operator. In one embodiment, the personalized alert may incorporate at least one of the visual alert, the auditory alert, and/or the haptic alert. In the same or another embodiment, the personalized alert may be based on at least one of: a driving habit, a criticality assessment, and/or a redundancy alert. For example, the driving habit may provide for customized alert preferences (e.g., vehicle operator habit analysis). For another example, the criticality assessment may provide for determining the alert's intensity (e.g., a situation criticality analysis). In some cases, the redundancy alert may ensure alert delivery across sensory modalities (e.g., multi-channel redundancy).

The visual alert may provide a visual cue to a vehicle operator that the vehicle has entered a speed-controlled zone. In one embodiment, the visual alert may comprise at least one of a dashboard icon, a heads-up display (HUD), and/or an augmented reality overlay. For example, the dashboard icon may display detected objects on the vehicle dashboard and provide recommended actions. In some embodiments, the HUD may be a transparent display that presents data without requiring vehicle operators to look away from their usual viewpoints. For another example, the HUD may be integrated into one or more portions of the vehicle (e.g., on the dashboard, an infotainment system, etc.). It is appreciated that the HUD may provide speed recommendations and hazard warnings. In some cases, the augmented reality overlay may highlight detected low-speed zone boundaries (e.g., on a front window, on a rear-view mirror, etc.).

The auditory alert may provide an audible cue to a vehicle operator that the vehicle has entered a speed-controlled zone. In one embodiment, the auditory alert may comprise at least one of a volume adjustment, a tone variation, and/or a prompt. For example, the volume adjustment may be based on noise levels within the vehicle's cabin and may adjust dynamically in response to a change in volume associated with the driving environment. In another embodiment, the tone variation may correspond to situation urgency. In some cases, the prompt may be capable of personalization (e.g., voice prompts with multilingual alerts).

The haptic alert may provide a physical cue and/or a tactile response (e.g., vibration, force, etc.) to a vehicle operator that the vehicle has entered a speed-controlled zone. In one embodiment, the haptic alert comprises at least one of a vibration, a temperature modulation, and/or a pedal resistance variation. For example, the vibration may comprise a vibration associated with a component (e.g., of the vehicle, of a remote-control center, etc.) in which the vehicle operator is in contact (e.g., a steering wheel, an operator seat, etc.). For another example, the temperature modulation may comprise a change in temperature associated with a component in which the vehicle operator is in contact (e.g., a steering wheel, an operator seat, an ambient vehicle temperature, etc.). It is appreciated that the temperature modulation may provide for attention capture of the vehicle operator without causing a distraction. In some embodiments, the pedal resistance variation may comprise a change in the vehicle's pedal resistance, which may encourage speed reduction.

The methods and systems disclosed herein may comprise one or more sophisticated alert sharing processes that may enable other systems to learn of alerts associated with the vehicle and adapt one or more of their responses accordingly. For example, the alerts may comprise Vehicle-to-Everything (V2X) integration.

In one embodiment, the alerts may be shared between one or more equipped vehicles (e.g., third-party vehicles) for enhanced situational awareness. It is appreciated that collaborative traffic pattern recognition may improve the system's accuracy. It is also appreciated that these systems may enable anonymous data contribution for machine learning model development.

In another embodiment, the alerts may be shared between one or more traffic management systems. It is appreciated that this alert sharing may provide for real-time traffic condition updates affecting speed recommendations. It is also appreciated that this sharing may enable emergency vehicle proximity detection for immediate alert escalation (e.g., to first responders).

The methods and systems may provide for a holistic perception of a driving environment. In one embodiment, multiple sensor modalities may be integrated with AI-driven scene understanding to provide comprehensive environmental awareness. It is appreciated that scene understanding may comprise the AI process of interpreting a visual environment, identifying objects, and understanding their spatial relationships. The methods and systems may provide contextual intelligence, using advanced reasoning algorithms that may consider geographic, environmental, and/or behavioral contexts for accurate low-speed zone prediction. In some embodiments, the methods and systems may adapt to individual vehicle operators, providing personalized alert generation and time optimization. This personalization may be based on a machine-learning based driver-behavior analysis. In some cases, the methods and systems may provide multimodal redundancy, providing a comprehensive feedback system that ensures alert delivery across one or more visual, auditory, and/or haptic channels with adaptive intensity. In one embodiment, the methods and systems may use collaborative intelligence, which may provide vehicle-to-vehicle communication to enable collective learning and enhanced prediction accuracy. It is appreciated that the methods and systems may comprise predictive capability for low-speed zone detection based on one or more of environmental cues and/or signage recognition.

Exemplary Workflow

Figure 5A:
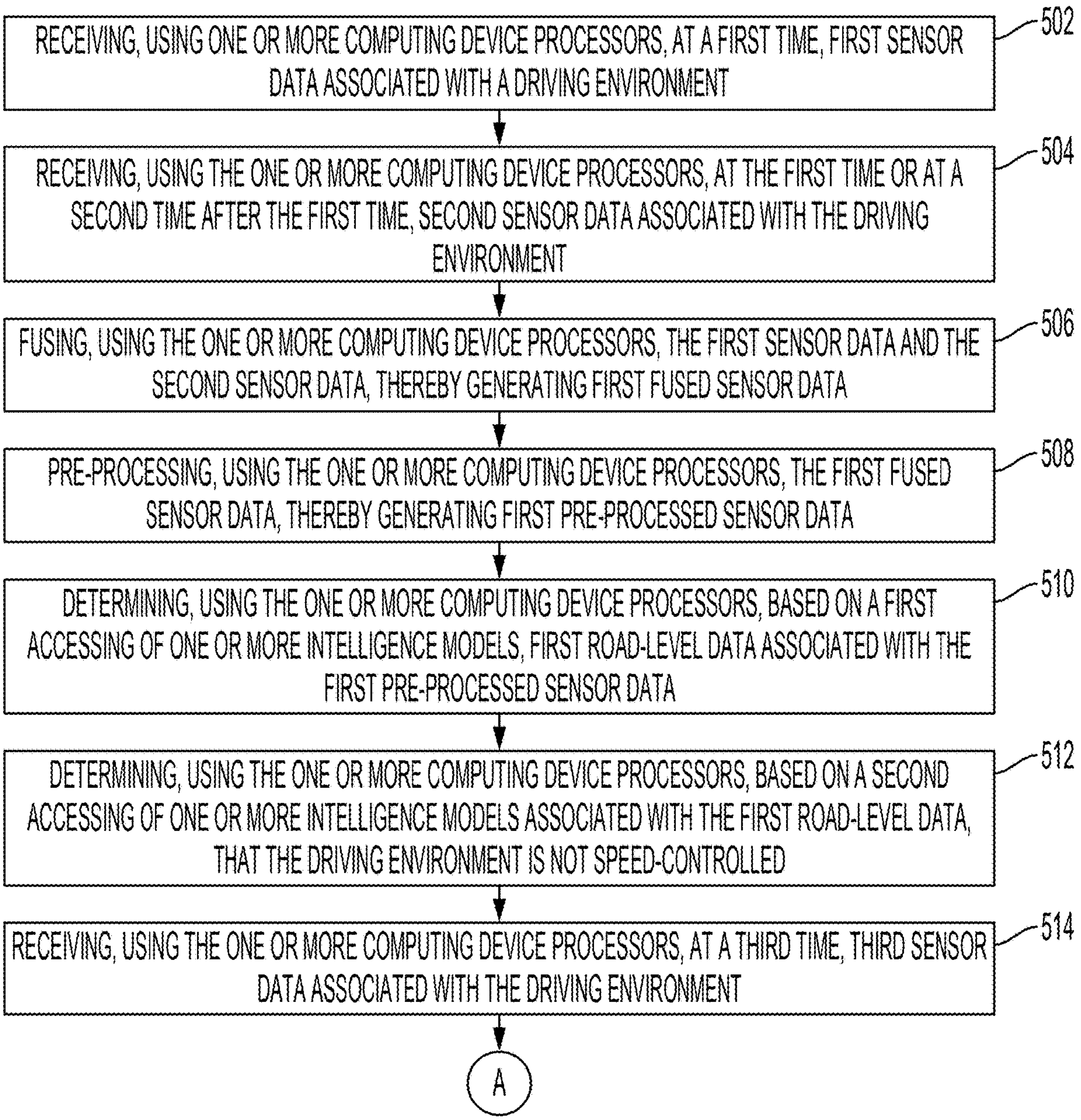
FIGS. 5A-5C show exemplary flowcharts for methods, systems/apparatuses, and computer program products for receiving sensor data associated with a driving environment and initiating one or more alerts associated with the driving environment to the vehicle operator.
Figure 5B:
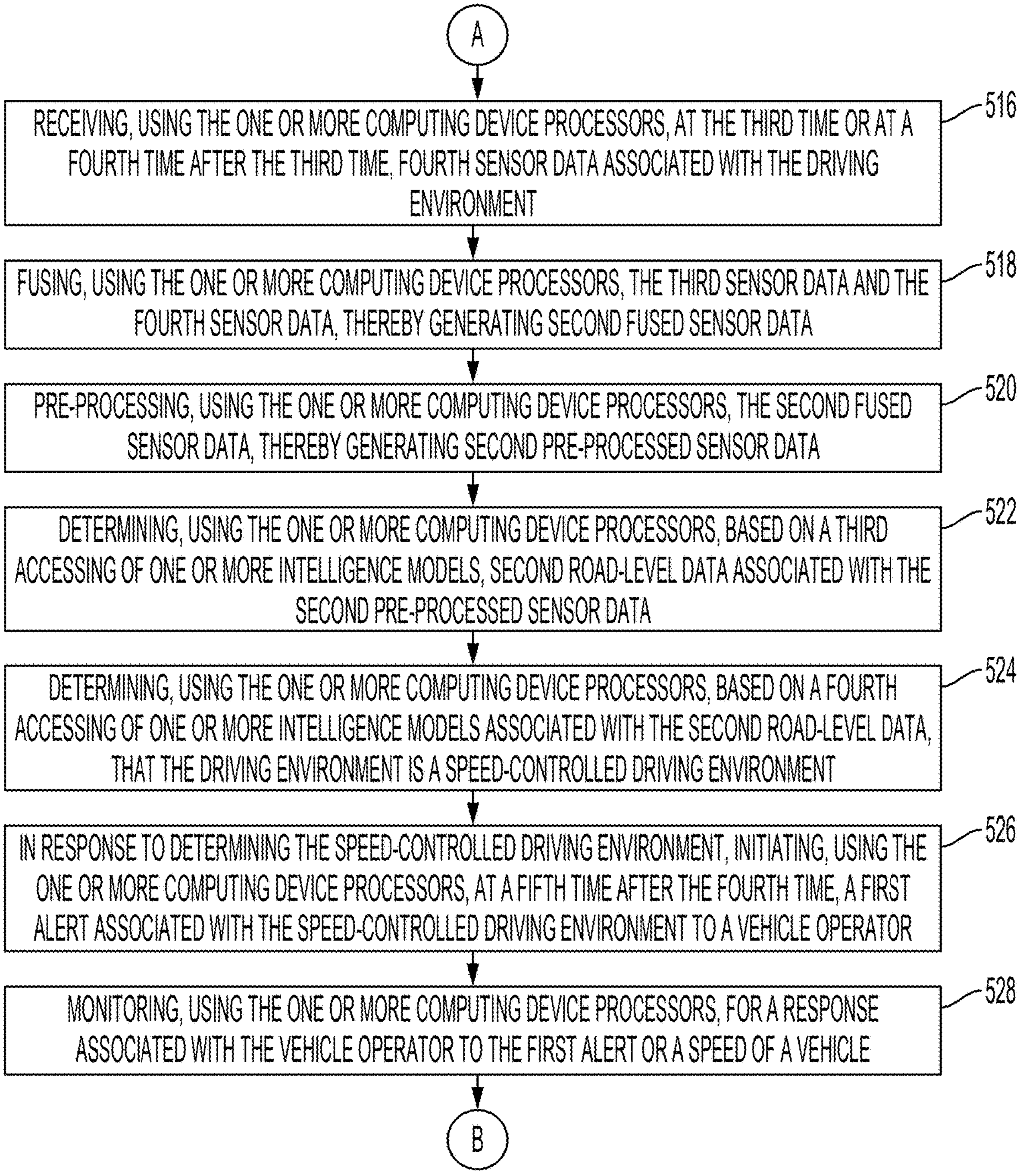
Figure 5C:
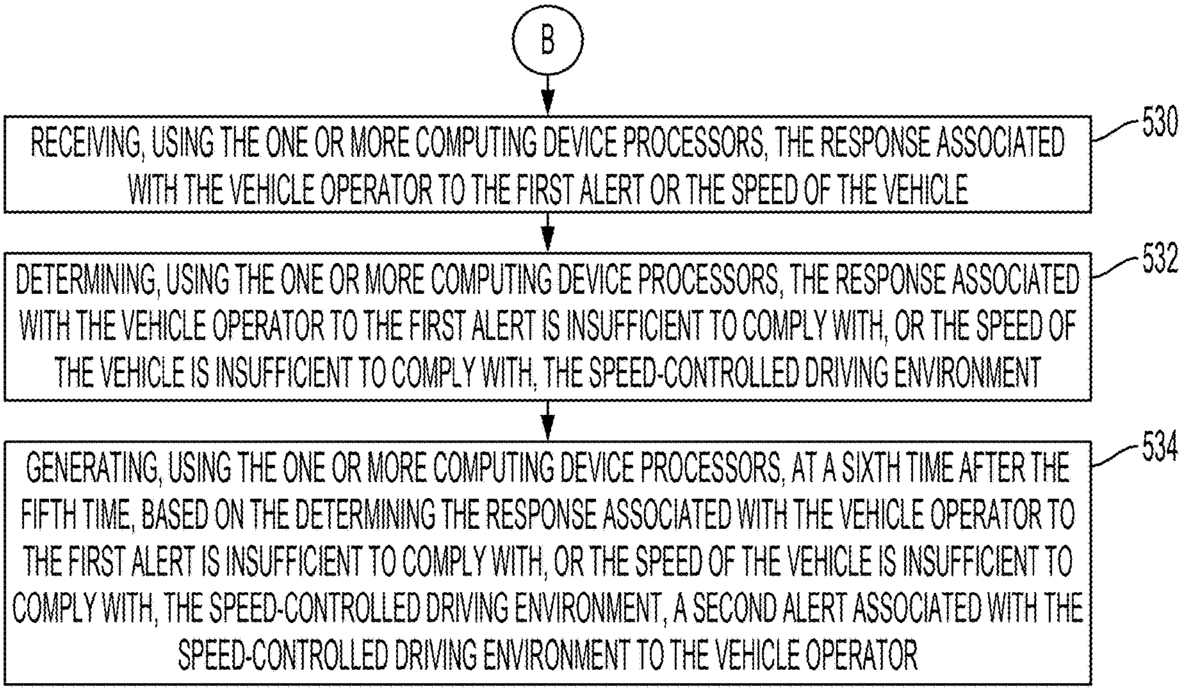

FIG. 5 illustrates an exemplary workflow for determining whether a driving environment is speed-controlled and alerting a vehicle operator to such determination. The various blocks of FIGS. 5A, 5B, and 5C may be executed in a different order from that shown in FIGS. 5A, 5B, and 5C. Some blocks may be optional. It is appreciated that one or more data engines stored in one or more memory devices may cause one or more computing device processors to execute the various processing stages of the workflow of FIGS. 5A, 5B, and 5C. In one embodiment, one or more data units, comprising control logic or applications stored in a non-transitory memory device, can enable the implementation of various processing stages within this workflow. These data units can operate independently or in conjunction with a data communication software tool for transmitting and/or receiving data, such as real-time, substantially real-time, or near real-time data. Furthermore, the one or more data units may comprise one or more of the above-referenced data unit 136 and/or intelligence unit 140, which collectively facilitate data handling and intelligent analysis. In one embodiment, the sensor data may comprise static or dynamic video data that is processed or otherwise analyzed to initiate a first alert associated with the driving environment to the vehicle operator, and generating a second alert if a response associated with the vehicle operator to the first alert is insufficient, thereby supporting applications in effective vehicular speed control. The specific references to data unit 136 and intelligence unit 140 indicate their roles in raw data processing and higher-level decision making within a broader system architecture, paving the way for the detailed processing stages that follow.

At block 502, the one or more data units may receive, at a first time, first sensor data associated with a driving environment. According to one embodiment, the first sensor data may comprise visual data that captures both static and dynamic objects in the driving environment (e.g., people, vehicles, trees, houses, etc.). The first sensor data may be received by one or more cameras. For example, the one or more cameras may provide for high-resolution imaging of the driving environment for visual scene analysis, object detection, road sign recognition, and/or environmental condition assessment. In another embodiment, the first sensor data may comprise LiDAR data received by one or more light detection and ranging (LiDAR) sensors. It is appreciated that the one or more LiDAR sensors may generate a virtual, 3D map of the driving environment for precise distance measurement, object classification, terrain mapping, etc. In some cases, the first sensor data may comprise radar data received by one or more radar sensors. For example, the one or more radar sensors may provide all-weather object detection, speed measurement of surrounding vehicles, obstacle identification, etc. In some embodiments, the first sensor data may comprise GPS data received by one or more global positioning system (GPS) sensors. It is appreciated that the one or more GPS sensors, including GPS sensors with enhanced positioning, may provide high-accuracy location determination when correlated with map data. In another embodiment, the first sensor data may comprise the vehicle's speed, acceleration, steering angle, and/or braking patterns. It is appreciated that this data may be received by one or more vehicle telemetry sensors. In one embodiment, one or more environmental conditions (e.g., rain, dust, fog, snow, etc.) and/or other general visibility concerns may be received by one or more weather sensors (e.g., specialized weather sensors).

At block 504, the one or more data units may receive, at the first time or at a second time after the first time, second sensor data associated with the driving environment. According to one embodiment, the second sensor data may comprise visual data that captures both static and dynamic objects in the driving environment (e.g., people, vehicles, trees, houses, etc.). The second sensor data may be received by one or more cameras. For example, the one or more cameras may provide for high-resolution imaging of the driving environment for visual scene analysis, object detection, road sign recognition, and/or environmental condition assessment. In another embodiment, the second sensor data may comprise LiDAR data received by one or more light detection and ranging (LiDAR) sensors. It is appreciated that the one or more LiDAR sensors may generate a virtual, 3D map of the driving environment for precise distance measurement, object classification, terrain mapping, etc. In some cases, the second sensor data may comprise radar data received by one or more radar sensors. For example, the one or more radar sensors may provide all-weather object detection, speed measurement of surrounding vehicles, obstacle identification, etc. In some embodiments, the second sensor data may comprise GPS data received by one or more global positioning system (GPS) sensors. It is appreciated that the one or more GPS sensors, including GPS sensors with enhanced positioning, may provide high-accuracy location determination when correlated with map data. In another embodiment, the second sensor data may comprise the vehicle's speed, acceleration, steering angle, and/or braking patterns. It is appreciated that this data may be received by one or more vehicle telemetry sensors. In one embodiment, one or more environmental conditions (e.g., rain, dust, fog, snow, etc.) and/or other general visibility concerns may be received by one or more weather sensors (e.g., specialized weather sensors).

At block 506, the one or more data units may fuse the first sensor data and the second sensor data, thereby generating first fused sensor data. It is appreciated that fusing may be a technique which combines data from multiple sensors to produce more accurate, reliable information than a single sensor can provide. In some embodiments, the fusing may comprise one or more aligning, filtering, and/or merging raw data streams from all sensors. This may involve temporal synchronization, which may ensure that data from different sensors correspond to the same point in time. This may also involve spatial alignment, which may project all sensor readings into a unified reference frame. For example, a GPS sensor may provide first sensor data which locates the vehicle between two streets and a camera may provide second sensor data which narrows the vehicle's location to a specific location between the two streets. The first fused sensor data may comprise the combination of the camera data and the GPS data, which may provide a more accurate location for the vehicle. It is appreciated that the fusing may be performed by more than two sets of sensor data and may be performed by any combination of sensor data. It is further appreciated that the fusing is not necessary to practice this invention. The fusing may only make the received data more accurate when it is later analyzed. The methods and systems may be practiced with only one first sensor data (e.g., at least one first sensor data).

At block 508, the one or more data units may pre-process the first fused sensor data, thereby generating first pre-processed sensor data. It is appreciated that the pre-processing may involve noise filtering to remove unreliable and/or redundant signals. It is also appreciated that pre-processing may comprise processing. For example, the first fused sensor data may comprise outlier data. The outlier data may be data that is not representative of the other data. In some cases, the outlier data may have originated from an error or a mis-calibration in the one or more sensors 110. The pre-processing may filter and clean this unreliable data to provide a coherent driving environment dataset (e.g., first pre-processed sensor data). Like the fusing, it is appreciated that the pre-processing is not necessary to practice this invention. The pre-processing may only make the received data more accurate when it is later analyzed. It is also appreciated that sensor data may be pre-processed individually, rather than after the fusing.

At block 510, the one or more data units may determine, based on a first accessing of one or more intelligence models, first road-level data associated with the first pre-processed sensor data. It is appreciated that the first accessing of one more intelligence models may comprise sharing the first pre-processed sensor data with one or more computer vision and/or deep learning algorithms that may extract first road-level data. In one embodiment, the one or more computer vision algorithms may interpret and/or analyze visual data from the driving environment. In another embodiment, the one or more deep learning algorithms may perform advanced machine learning techniques using one or more neural networks with one or more layers to automatically learn complex features from the first pre-processed sensor data.

In one embodiment, the first road-level data may comprise data associated with the vehicle operator, the vehicle, and/or an immediate vicinity of the vehicle. For example, the first road-level data may comprise lane curvature, trees, road structures, road-side structures, speed signs, visual cues, environmental conditions, etc. It is appreciated that the first road-level data may comprise any information that may suggest or necessitate an immediate adjustment to a vehicle speed. It is also appreciated that the determining, based on the first accessing of the one or more intelligence models, may comprise determining first driving environment data. In one embodiment, the first driving environment data may comprise both first road-level data and a broader field of information related to the driving environment than the first road-level data. In some embodiments, the first driving environment data may comprise road-level data associated with the driving environment at a greater distance than the immediate vicinity of the vehicle. For example, the first driving environment data may be a vehicle accident two miles ahead along the vehicle's path that may eventually necessitate a reduction in vehicle speed but may not require an immediate reduction in vehicle speed. In some embodiments, the primary difference between the first driving environment data and the first road-level data may not be the type of data received, but may be the proximity of the data point to one or more of the vehicle operator, the vehicle, and/or the road.

In some cases, the determining the first road-level data and/or the first driving environment data may comprise one or more feature extraction processes. It is appreciated that the one or more feature extraction processes may comprise any process (e.g., accessing an intelligence model) that takes one or more of the first sensor data, the second sensor data, and/or the first fused sensor data and determines an associated feature of the driving environment (e.g., a tree, a building, a car, a person, etc.). In one embodiment, the one or more feature extraction processes are based on at least one of: a road analysis (e.g., analyzing lane curvature, road width, road tilt, road shoulder, road curbs, etc.), an infrastructure classification (e.g., identifying and classifying schools, hospitals, mosques, residential zones, sidewalks, and/or other speed-sensitive areas), a vegetation analysis (e.g., analyzing trees, parks, bushes, mountains, landslides, etc.), a traffic density estimation (e.g., number of cars per one mile), and/or a vehicle behavior pattern recognition (e.g., one or more vehicles frequently adjust speeding, changing lanes, brake checking, stopping, etc.).

At block 512, the one or more data units may determine, based on a second accessing of one or more intelligence models associated with the first road-level data, that the driving environment is not speed-controlled. It is appreciated that a driving environment (e.g., speed-controlled zone) may not be speed-controlled because it is not legally required (e.g., no speed limits) and it is not contextually advised for safety (e.g., no unsafe driving conditions). For example, the driving environment may not be speed-controlled if there is no legal speed-limit and if there is not a contextually advisable speed. In some embodiments, the driving environment may not be speed-controlled if there is either no legal speed-limit or if there is not a contextually advisable speed. It is appreciated that the one or more intelligence models may comprise one or more contextual reasoning models. In one embodiment, the one or more contextual reasoning models may be based on at least one of: a geographical context integration (e.g., relationship between the vehicle and its surrounding geography), an environmental condition analysis (e.g., relationship between the vehicle and its surrounding environmental conditions), and/or an operator behavior profile (e.g., historical and contemporary data associated with the operator's driving habits). In some embodiments, the geographical context integration may comprise at least one of: a correlation with one or more predefined locations (e.g., an association between known data points on a map and real-time GPS data), a geofence (e.g., a dynamic geofence that updates based on real-time sensor data and/or other traffic management data), and/or traffic data (e.g., a historical traffic pattern analysis). In other embodiments, the environmental condition analysis may be based on at least one of: a weather assessment (e.g., to assess safe driving speeds under current weather conditions), a road condition assessment (e.g., to determine the condition of the road surface), and/or a visibility assessment (e.g., to determine and analyze visibility conditions). In some cases, the operator behavior profile may comprise at least one of a driving pattern (e.g., the operator's driving pattern), a response time (e.g., between an alert and the response), and/or a behavioral prediction (e.g., an intelligent prediction of the operator's behavior based on data associated with the operator behavior profile).

At block 514, the one or more data units may receive, at a third time, third sensor data associated with the driving environment. According to one embodiment, the third sensor data may comprise visual data that captures both static and dynamic objects in the driving environment (e.g., people, vehicles, trees, houses, etc.). The third sensor data may be received by one or more cameras. For example, the one or more cameras may provide for high-resolution imaging of the driving environment for visual scene analysis, object detection, road sign recognition, and/or environmental condition assessment. In another embodiment, the third sensor data may comprise LiDAR data received by one or more light detection and ranging (LiDAR) sensors. It is appreciated that the one or more LiDAR sensors may generate a virtual, 3D map of the driving environment for precise distance measurement, object classification, terrain mapping, etc. In some cases, the third sensor data may comprise radar data received by one or more radar sensors. For example, the one or more radar sensors may provide all-weather object detection, speed measurement of surrounding vehicles, obstacle identification, etc. In some embodiments, the third sensor data may comprise GPS data received by one or more global positioning system (GPS) sensors. It is appreciated that the one or more GPS sensors, including GPS sensors with enhanced positioning, may provide high-accuracy location determination when correlated with map data. In another embodiment, the third sensor data may comprise the vehicle's speed, acceleration, steering angle, and/or braking patterns. It is appreciated that this data may be received by one or more vehicle telemetry sensors. In one embodiment, one or more environmental conditions (e.g., rain, dust, fog, snow, etc.) and/or other general visibility concerns may be received by one or more weather sensors (e.g., specialized weather sensors).

At block 516, the one or more data units may receive, at the third time or at a fourth time after the third time, fourth sensor data associated with the driving environment. According to one embodiment, the fourth sensor data may comprise visual data that captures both static and dynamic objects in the driving environment (e.g., people, vehicles, trees, houses, etc.). The fourth sensor data may be received by one or more cameras. For example, the one or more cameras may provide for high-resolution imaging of the driving environment for visual scene analysis, object detection, road sign recognition, and/or environmental condition assessment. In another embodiment, the fourth sensor data may comprise LiDAR data received by one or more light detection and ranging (LiDAR) sensors. It is appreciated that the one or more LiDAR sensors may generate a virtual, 3D map of the driving environment for precise distance measurement, object classification, terrain mapping, etc. In some cases, the fourth sensor data may comprise radar data received by one or more radar sensors. For example, the one or more radar sensors may provide all-weather object detection, speed measurement of surrounding vehicles, obstacle identification, etc. In some embodiments, the fourth sensor data may comprise GPS data received by one or more global positioning system (GPS) sensors. It is appreciated that the one or more GPS sensors, including GPS sensors with enhanced positioning, may provide high-accuracy location determination when correlated with map data. In another embodiment, the fourth sensor data may comprise the vehicle's speed, acceleration, steering angle, and/or braking patterns. It is appreciated that this data may be received by one or more vehicle telemetry sensors. In one embodiment, one or more environmental conditions (e.g., rain, dust, fog, snow, etc.) and/or other general visibility concerns may be received by one or more weather sensors (e.g., specialized weather sensors).

At block 518, the one or more data units may fuse the third sensor data and the fourth sensor data, thereby generating second fused sensor data. It is appreciated that fusing may be a technique which combines data from multiple sensors to produce more accurate, reliable information than a single sensor can provide. In some embodiments, the fusing may comprise one or more aligning, filtering, and/or merging raw data streams from all sensors. This may involve temporal synchronization, which may ensure that data from different sensors correspond to the same point in time. This may also involve spatial alignment, which may project all sensor readings into a unified reference frame. For example, a GPS sensor may provide third sensor data which locates the vehicle between two streets and a camera may provide fourth sensor data which narrows the vehicle's location to a specific location between the two streets. The second fused sensor data may comprise the combination of the camera data and the GPS data, which may provide a more accurate location for the vehicle. It is appreciated that the fusing may be performed by more than two sets of sensor data and may be performed by any combination of sensor data. It is further appreciated that the fusing is not necessary to practice this invention. The fusing may only make the received data more accurate when it is later analyzed. The methods and systems may be practiced with only one second sensor data (e.g., at least one second sensor data).

At block 520, the one or more data units may pre-process the second fused sensor data, thereby generating second pre-processed sensor data. It is appreciated that the pre-processing may involve noise filtering to remove unreliable and/or redundant signals. It is also appreciated that pre-processing may comprise processing. For example, the second fused sensor data may comprise outlier data. The outlier data may be data that is not representative of the other data. In some cases, the outlier data may have originated from an error or a mis-calibration in the one or more sensors 110. The pre-processing may filter and clean this unreliable data to provide a coherent driving environment dataset (e.g., second pre-processed sensor data). Like the fusing, it is appreciated that the pre-processing is not necessary to practice this invention. The pre-processing may only make the received data more accurate when it is later analyzed. It is also appreciated that sensor data may be pre-processed individually, rather than after the fusing.

At block 522, the one or more data units may determine, based on a third accessing of one or more intelligence models, second road-level data associated with the second pre-processed sensor data. It is appreciated that the third accessing of one more intelligence models may comprise sharing the second pre-processed sensor data with one or more computer vision and/or deep learning algorithms that may extract second road-level data. In one embodiment, the one or more computer vision algorithms may interpret and/or analyze visual data from the driving environment. In another embodiment, the one or more deep learning algorithms may perform advanced machine learning techniques using one or more neural networks with one or more layers to automatically learn complex features from the second pre-processed sensor data.

In one embodiment, the second road-level data may comprise data associated with the vehicle operator, the vehicle, and/or an immediate vicinity of the vehicle. For example, the second road-level data may comprise lane curvature, trees, road structures, road-side structures, speed signs, visual cues, environmental conditions, etc. It is appreciated that the second road-level data may comprise any information that may suggest or necessitate an immediate adjustment to a vehicle speed. It is also appreciated that the determining, based on the third accessing of the one or more intelligence models, may comprise determining second driving environment data. In one embodiment, the second driving environment data may comprise both second road-level data and a broader field of information related to the driving environment than the second road-level data. In some embodiments, the second driving environment data may comprise road-level data associated with the driving environment at a greater distance than the immediate vicinity of the vehicle. For example, the second driving environment data may be a vehicle accident two miles ahead along the vehicle's path that may eventually necessitate a reduction in vehicle speed but may not require an immediate reduction in vehicle speed. In some embodiments, the primary difference between the second driving environment data and the second road-level data may not be the type of data received, but may be the proximity of the data point to one or more of the vehicle operator, the vehicle, and/or the road.

In some cases, the determining the second road-level data and/or the second driving environment data may comprise one or more feature extraction processes. It is appreciated that the one or more feature extraction processes may comprise any process (e.g., accessing an intelligence model) that takes one or more of the third sensor data, the fourth sensor data, and/or the second fused sensor data and determines an associated feature of the driving environment (e.g., a tree, a building, a car, a person, etc.). In one embodiment, the one or more feature extraction processes are based on at least one of: a road analysis (e.g., analyzing lane curvature, road width, road tilt, road shoulder, road curbs, etc.), an infrastructure classification (e.g., identifying and classifying schools, hospitals, mosques, residential zones, sidewalks, and/or other speed-sensitive areas), a vegetation analysis (e.g., analyzing trees, parks, bushes, forests, farms, etc.), a traffic density estimation (e.g., number of cars per one mile), and/or a vehicle behavior pattern recognition (e.g., one or more vehicles frequently adjust speeding, changing lanes, brake checking, stopping, etc.).

At block 524, the one or more data units may determine, based on a fourth accessing of one or more intelligence models associated with the second road-level data, that the driving environment is a speed-controlled driving environment. It is appreciated that a driving environment (e.g., speed-controlled zone) may be speed-controlled because it is legally required (e.g., speed limits) and/or contextually advisable for safety (e.g., unsafe driving conditions). It is appreciated that the one or more intelligence models may comprise one or more contextual reasoning models. In one embodiment, the one or more contextual reasoning models may be based on at least one of: a geographical context integration (e.g., relationship between the vehicle and its surrounding geography), an environmental condition analysis (e.g., relationship between the vehicle and its surrounding environmental conditions), and/or an operator behavior profile (e.g., historical and contemporary data associated with the operator's driving habits). In some embodiments, the geographical context integration may comprise at least one of: a correlation with one or more predefined locations (e.g., an association between known data points on a map and real-time GPS data), a geofence (e.g., a dynamic geofence that updates based on real-time sensor data and/or other traffic management data), and/or traffic data (e.g., a historical traffic pattern analysis). In other embodiments, the environmental condition analysis may be based on at least one of: a weather assessment (e.g., to assess safe driving speeds under current weather conditions), a road condition assessment (e.g., to determine the condition of the road surface), and/or a visibility assessment (e.g., to determine and analyze visibility conditions). In some cases, the operator behavior profile may comprise at least one of a driving pattern (e.g., the operator's driving pattern), a response time (e.g., between an alert and the response), and/or a behavioral prediction (e.g., an intelligent prediction of the operator's behavior based on data associated with the operator behavior profile).

At block 526, in response to determining the speed-controlled driving environment, the one or more data units may initiate, at a fifth time after the fourth time, a first alert associated with the speed-controlled driving environment to a vehicle operator. In one embodiment, the first alert may be strong (e.g., to indicate that a speed adjustment is immediately necessary). In another embodiment, the first alert may be limited (e.g., just strong enough to alert the vehicle operator without causing a significant distraction). In either instance, the first alert may be associated with the speed-controlled driving environment. In some embodiments, the first alert may comprise at least one of: a personalized alert (e.g., personalized to the unique vehicle operator based on explicit and/or learned preferences), a visual alert (e.g., a dashboard icon, a HUD, an augmented reality overlay, etc.), an auditory alert (e.g., a volume adjustment, a tone variation, a prompt, etc.), and/or a haptic alert (e.g., a vibration, a temperature modulation, a pedal resistance variation, etc.). In one embodiment, the personalized alert may incorporate at least one of: the visual alert, the auditory alert, and/or the haptic alert. In the same or another embodiment, the personalized alert may be based on at least one of: a driving pattern (e.g., for customizing alert preferences), a situation assessment (e.g., for determining alert intensity), and/or a redundancy alert (e.g., for ensuring alert delivery across sensory modalities). For example, the driving pattern may bolster the personalized alert by providing alert-types which the vehicle operator has historically responded appropriately. In some cases, the situation assessment bolsters the personalized alert by delivering proportionate levels of alert intensity based on the situation (e.g., a more intense alert for needing to immediately stop, a less intense alert for needing to slightly slow the speed of the vehicle, etc.). In other cases, the redundancy alert may comprise a subsequent alert if the first alert fails (e.g., because the alert mechanism malfunctions, etc.).

At block 528, the one or more data units may monitor for a response associated with the vehicle operator to the first alert or a speed of a vehicle. In one embodiment, the response associated with the vehicle operator to the first alert may comprise one or more of moving the vehicle operator's hands (e.g., towards a vehicle wheel and/or a vehicle gear shift), turning the vehicle operator's head (e.g., towards a mirror and/or a window), and/or moving the vehicle operator's foot (e.g., towards a vehicle braking component and/or a shifting component). In some embodiments, the response associated with the vehicle operator to the first alert may be more nuanced (e.g., tensing shoulders in anticipation of a collision). In some cases, the one or more data units may monitor the speed of the vehicle. It is appreciated that the first alert may have been effective if the speed of the vehicle is slowed (e.g., the vehicle operator received the first alert and slowed the speed of the vehicle). In other embodiments, the response associated with the vehicle operator to the first alert and/or the change of the speed of the vehicle may have been insignificant, which may necessitate a second alert.

At block 530, the one or more data units may receive the response associated with the vehicle operator to the first alert or the speed of the vehicle. In one embodiment, receiving the response may comprise using and/or communicating with the one or more sensors 110. In some embodiments, the vehicle may use one or more visual sensors to receive the vehicle operator's physical response to the first alert. In other embodiments, the vehicle may use one or more audio sensors to receive audible cues related to the vehicle operator's response. These are exemplary embodiments only, and it is appreciated that that other sensors comprised in the one or more sensors 110 may be used to receive the response associated with the vehicle operator to the first alert. It is also appreciated that the one or more sensors may receive the speed of the vehicle (e.g., vehicle telemetry sensor, odometer, etc.).

At block 532, the one or more data units may determine the response associated with the vehicle operator to the first alert is insufficient to comply with, or the speed of the vehicle is insufficient to comply with, the speed-controlled driving environment. It is appreciated that the speed-controlled driving environment (e.g., speed-controlled zone) may be speed-controlled because it is legally required (e.g., speed limits) and/or contextually advisable for safety (e.g., unsafe driving conditions). For example, a contextually advisable speed may be lower than a posted speed-limit. For another example, the contextually advisable speed may be the suggested speed because the driving environment lacks a posted speed-limit. In one embodiment, the response associated with the vehicle operator to the first alert may be insufficient because the vehicle operator takes little or no action to reduce the speed of the vehicle in the speed-controlled zone (e.g., continuing to exceed a posted speed limit and/or to move faster than the contextually advisable speed). In some embodiments, the response may be sufficient even if the speed of the vehicle has not yet been slowed (e.g., there is sufficient time for the vehicle operator to avoid a collision based on the vehicle operator's current response). In another embodiment, the speed of the vehicle may not comply with the speed-controlled zone because it is exceeding the posted speed-limit and/or moving faster than the contextually advisable speed.

At block 534, the one or more data units may generate, at a sixth time after the fifth time, based on the determining the response associated with the vehicle operator to the first alert is insufficient to comply with, or the speed of the vehicle is insufficient to comply with, the speed-controlled driving environment, a second alert associated with the speed-controlled driving environment to the vehicle operator. As discussed with respect to block 518, the response associated with the vehicle operator to the first alert and/or the speed of the vehicle may not be adequate to meet the speed-controlled driving environment. It is appreciated that the second alert may be more intense than the first alert (e.g., to indicate that the response to the first alert and/or the speed of the vehicle are insufficient to comply with the speed-controlled driving environment). In some embodiments, the second alert may comprise at least one of: a personalized alert (e.g., personalized to the unique vehicle operator based on explicit and/or learned preferences), a visual alert (e.g., a dashboard icon, a HUD, an augmented reality overlay, etc.), an auditory alert (e.g., a volume adjustment, a tone variation, a prompt, etc.), and/or a haptic alert (e.g., a vibration, a temperature modulation, a pedal resistance variation, etc.). In one embodiment, the personalized alert may incorporate at least one of: the visual alert, the auditory alert, and/or the haptic alert. In the same or another embodiment, the personalized alert may be based on at least one of: a driving pattern (e.g., for customizing alert preferences), a situation assessment (e.g., for determining alert intensity), and/or a redundancy alert (e.g., for ensuring alert delivery across sensory modalities). For example, the driving pattern may bolster the personalized alert by providing alert-types which the vehicle operator has historically responded appropriately. In some cases, the situation assessment bolsters the personalized alert by delivering proportionate levels of alert intensity based on the situation (e.g., a more intense alert for needing to immediately stop, a less intense alert for needing to slightly slow the speed of the vehicle, etc.). In other cases, the redundancy alert may comprise a subsequent alert if the first alert fails (e.g., because the alert mechanism malfunctions, etc.). It is appreciated that the methods and systems disclosed herein may continuously monitor the driving environment and initiate more than two alerts. For example, the vehicle operator may not sufficiently respond to the second alert, and at least one or more additional alerts may be initiated to capture the vehicle operator's attention.

In one embodiment, the one or more data units may share at least one of the first alert or the second alert to one or more vehicles. It is appreciated that the methods and systems disclosed herein may function more effectively when alerts are shared between one or more vehicles. For example, a first vehicle may share an alert with a second vehicle if they are within the same speed-controlled zone. In some embodiments, the methods and systems may be adapted to share other information (e.g., sensor data, fused sensor data, etc.). For example, a first vehicle may gather GPS data associated with its location, share its GPS data with a second vehicle, and the second vehicle may fuse together the GPS data associated with the first vehicle's location with LiDAR data associated with the first vehicle that the second vehicle gathered. In this example, the second vehicle may have identified a more precise location and speed of the first vehicle. It is further appreciated that sharing any type of data received (e.g., sensor data) and/or determined (e.g., road-level data, driving environment data) by the vehicle to the one or more vehicles may improve the overall effectiveness of the methods and systems.

In another embodiment, the one or more data units may share at least one of the first alert or the second alert to one or more traffic management systems. For example, the one or more traffic management systems may be owned and/or operated by public (e.g., government traffic regulation and enforcement bodies) and/or private (e.g., non-profit, for-profit) entities. It is appreciated that this alert sharing may improve the overall effectiveness of the methods and systems disclosed herein. In some embodiments, the methods and systems may be adapted to share other information (e.g., sensor data, fused sensor data, etc.). For example, one or more vehicles may share their data (e.g., LiDAR data, GPS data, etc.) with the one or more traffic management systems, and the one or more traffic management systems may share this data with the one or more intelligence models. It is further appreciated that sharing any type of data received (e.g., sensor data) and/or determined (e.g., road-level data, driving environment data) by the vehicle to the one or more traffic management systems may improve the overall effectiveness of the methods and systems.

In some cases, one or more of the methods and/or systems practiced herein may be performed by one or more computing device processors. It is appreciated that the one or more computing device processors may be comprised in one or more computing systems, wherein the one or more computing systems are located in one or more locations. For example, the one or more computing systems may be located in one or more sensors, at a location associated with the physical environment, and/or at a remote processing location.

In some embodiments, the alerts may may comprise additional operations that autonomously control the speed of the vehicle. For example, the alert may comprise applying a brake to cause the vehicle to slow down. In some cases, this operation may be based on the first alert, the second alert, or an additional alert.

The terminology used in this disclosure is for the purpose of describing particular exemplary embodiments and is not intended to be limiting. For example, as used herein, the singular forms "a," "an," and "the" may be intended to include plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, processes, elements, components, and/or groups thereof. The described method steps, processes, and operations are not to be construed as necessarily requiring their performance in the particular order discussed or illustrated, unless specifically identified as an order of performance. It is further appreciated that additional or alternative steps may be employed according to some implementations.

Although the terms first, second, third, etc., may be used to describe various elements, components, regions, layers and/or sections, these elements, components, regions, layers and/or sections should not be limited by these terms. These terms may be used to distinguish one element, component, region, layer or section from another element, component, region, layer or section. That is, terms such as "first," "second," and other numerical terms, when used in this disclosure, do not imply a sequence or order unless clearly indicated by the context. In addition, the term optimal and its variants (e.g., efficient, optimally, etc.) as used in this disclosure may simply indicate improving, rather than the ultimate form of 'perfection' or the like.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is appreciated that the scope of the present disclosure be limited not by this detailed description, but rather by the claims of this application. The present disclosure may be embodied in other specific forms without departing from the spirit or essential characteristics thereof. Accordingly, the above discussed subject-matter is illustrative, but not limiting, of the scope of the present disclosure, which is set forth in the following claim.

What is claimed is:

1. A method executed by an intelligent driver assistance system for substantially real-time processing of multi-modal sensor data that generates and automatically escalates an improved contextualized speed-controlled zone alert, the method comprising:

receiving, using one or more computing device processors and one or more advanced driver assistance systems, at a first time, first sensor data associated with a driving environment;

receiving, using the one or more computing device processors and the one or more advanced driver assistance systems, at the first time or at a second time after the first time, second sensor data associated with the driving environment;

fusing, using the one or more computing device processors, the first sensor data and the second sensor data, thereby generating first fused sensor data, wherein the fusing the first sensor data and the second sensor data comprises synchronizing a first timestamp associated with the first sensor data and a second timestamp associated with the second sensor data;

pre-processing, using the one or more computing device processors, the first fused sensor data, thereby generating first pre-processed sensor data, wherein the pre-processing the first fused sensor data comprises executing a first computer-implemented signal conditioning operation comprising a first noise reduction operation and a first outlier suppression operation;

determining, using the one or more computing device processors, based on a first accessing of one or more intelligence models, first road-level data associated with the first pre-processed sensor data;

determining, using the one or more computing device processors, based on a second accessing of the one or more intelligence models associated with the first road-level data, that the driving environment is not speed-controlled;

receiving, using the one or more computing device processors and the one or more advanced driver assistance systems, at a third time, third sensor data associated with the driving environment;

receiving, using the one or more computing device processors and the one or more advanced driver assistance systems, at the third time or at a fourth time after the third time, fourth sensor data associated with the driving environment;

fusing, using the one or more computing device processors, the third sensor data and the fourth sensor data, thereby generating second fused sensor data, wherein the fusing the third sensor data and the fourth sensor data comprises synchronizing a third timestamp associated with the third sensor data and a fourth timestamp associated with the fourth sensor data;

pre-processing, using the one or more computing device processors, the second fused sensor data, thereby generating second pre-processed sensor data, wherein the pre-processing the second fused sensor data comprises executing a second computer-implemented signal conditioning operation comprising a second noise reduction operation and a second outlier suppression operation;

determining, using the one or more computing device processors, based on a third accessing of the one or more intelligence models, second road-level data associated with the second pre-processed sensor data;

determining, using the one or more computing device processors, based on a fourth accessing of the one or more intelligence models associated with the second road-level data, that the driving environment is a speed-controlled driving environment, wherein the determining that the driving environment is the speed-controlled driving environment comprises:

applying a dynamic geofence to one or more digital datapoints associated with the driving environment, updating a digital radius associated with the dynamic geofence based on the second road-level data, identifying a data object comprised in the digital radius, and analyzing the data object to determine the speed-controlled driving environment;

in response to determining the speed-controlled driving environment, initiating, using the one or more computing device processors, at a fifth time after the fourth time, a first alert associated with the speed-controlled driving environment to a first computing device associated with a vehicle;

monitoring, using the one or more computing device processors and the one or more advanced driver assistance systems, for a response associated with a vehicle operator associated with the vehicle to the first alert or a speed of the vehicle;

receiving, using the one or more computing device processors and the one or more advanced driver assistance systems, the response associated with the vehicle operator to the first alert or the speed of the vehicle;

determining, using the one or more computing device processors, the response associated with the vehicle operator to the first alert is insufficient to comply with, or the speed of the vehicle is insufficient to comply with, the speed-controlled driving environment; and generating, using the one or more computing device processors, at a sixth time after the fifth time, based on the determining the response associated with the vehicle operator to the first alert is insufficient to comply with, or the speed of the vehicle is insufficient to comply with, the speed-controlled driving environment, a second alert associated with the speed-controlled driving environment to the first computing device, wherein the second alert comprises a higher alert intensity than the first alert.

2. The method of claim 1, wherein the one or more advanced driver assistance systems comprise using or communicating with at least one of: a camera, a radar sensor, a light detection and ranging sensor (LiDAR), a global positioning system (GPS) sensor, a vehicle telemetry sensor, or a weather sensor.

3. The method of claim 1, wherein determining at least one of the first road-level data or the second road-level data comprises one or more feature extraction processes, wherein the one or more feature extraction processes are based on at least one of: a road analysis, an infrastructure classification, a vegetation analysis, a traffic density estimation, or a vehicle behavior pattern recognition.

4. The method of claim 1, wherein the one or more intelligence models comprise one or more contextual reasoning models, wherein the one or more contextual reasoning models are based on at least one of a geographical context integration, an environmental condition analysis, or an operator behavior profile.

5. The method of claim 4, wherein the geographical context integration comprises at least one of a correlation with one or more predefined locations, a geofence, or traffic data.

6. The method of claim 4, wherein the environmental condition analysis is based on at least one of a weather assessment, a road condition assessment, or a visibility assessment.

7. The method of claim 4, wherein the operator behavior profile comprises at least one of a driving pattern, a response time, or a behavioral prediction.

8. One or more systems executed by an intelligent driver assistance system for substantially real-time processing of multi-modal sensor data that generates and automatically escalates an improved contextualized speed-controlled zone alert, the one or more systems comprising:

one or more computing databases;

one or more computing servers comprising one or more computing device processors and a memory storing instructions, the instructions being executable by the one or more computing device processors to:

receive, using one or more advanced driver assistance systems, at a first time, first sensor data associated with a driving environment;

receive, using the one or more advanced driver assistance systems, at the first time or at a second time after the first time, second sensor data associated with the driving environment;

fuse the first sensor data and the second sensor data, thereby generating first fused sensor data, wherein the fuse the first sensor data and the second sensor data comprises synchronizing a first timestamp associated with the first sensor data and a second timestamp associated with the second sensor data;

pre-process the first fused sensor data, thereby generating first pre-processed sensor data, wherein the pre-process the first fused sensor data comprises executing a first computer-implemented signal conditioning operation comprising a first noise reduction operation and a first outlier suppression operation;

determine, based on a first accessing of one or more intelligence models, first road-level data associated with the first pre-processed sensor data;

determine, based on a second accessing of the one or more intelligence models associated with the first road-level data, that the driving environment is not speed-controlled;

receive, using the one or more advanced driver assistance systems, at a third time, third sensor data associated with the driving environment;

receive, using the one or more advanced driver assistance systems, at the third time or at a fourth time after the third time, fourth sensor data associated with the driving environment;

fuse the third sensor data and the fourth sensor data, thereby generating second fused sensor data, wherein the fuse the third sensor data and the fourth sensor data comprises synchronizing a third timestamp associated with the third sensor data and a fourth timestamp associated with the fourth sensor data;

pre-process the second fused sensor data, thereby generating second pre-processed sensor data, wherein the pre-process the second fused sensor data comprises executing a second computer-implemented signal conditioning operation comprising a second noise reduction operation and a second outlier suppression operation;

determine, based on a third accessing of the one or more intelligence models, second road-level data associated with the second pre-processed sensor data;

determine, based on a fourth accessing of the one or more intelligence models associated with the second road-level data, that the driving environment is a speed-controlled driving environment, wherein the determine that the driving environment is the speed-controlled driving environment comprises:

applying a dynamic geofence to one or more digital datapoints associated with the driving environment, updating a digital radius associated with the dynamic geofence based on the second road-level data, identifying a data object comprised in the digital radius, and analyzing the data object to determine the speed-controlled driving environment;

in response to determining the speed-controlled driving environment, initiate, at a fifth time after the fourth time, a first alert associated with the speed-controlled driving environment to a first computing device associated with a vehicle;

monitor, using the one or more advanced driver assistance systems, for a response associated with a vehicle operator associated with the vehicle to the first alert or a speed of the vehicle;

receive, using the one or more advanced driver assistance systems, the response associated with the vehicle operator to the first alert or the speed of the vehicle;

determine the response associated with the vehicle operator to the first alert is insufficient to comply with, or the speed of the vehicle is insufficient to comply with, the speed-controlled driving environment; and generate, at a sixth time after the fifth time, based on the determine the response associated with the vehicle operator to the first alert is insufficient to comply with, or the speed of the vehicle is insufficient to comply with, the speed-controlled driving environment, a second alert associated with the speed-controlled driving environment to the first computing device, wherein the second alert comprises a higher alert intensity than the first alert.

9. The one or more systems of claim 8, wherein at least one of the first alert or the second alert comprise at least one of: a personalized alert, a visual alert, an auditory alert, or a haptic alert.

10. The one or more systems of claim 9, wherein:

the personalized alert incorporates at least one of: the visual alert, the auditory alert, or the haptic alert, and the personalized alert is based on at least one of: a driving pattern, a situation assessment, or a redundancy alert.

11. The one or more systems of claim 9, wherein the visual alert comprises at least one of: a dashboard icon, a heads-up display, or an augmented reality overlay.

12. The one or more systems of claim 9, wherein the auditory alert comprises at least one of: a volume adjustment, a tone variation, or a prompt.

13. The one or more systems of claim 9, wherein the haptic alert comprises at least one of: a vibration, a temperature modulation, or a pedal resistance variation.

14. A method executed by an intelligent driver assistance system for substantially real-time processing of multi-modal sensor data that generates and automatically escalates an improved contextualized speed-controlled zone alert, the method comprising:

receiving, using one or more computing device processors and one or more advanced driver assistance systems, at least one first sensor data associated with a driving environment;

pre-processing, using the one or more computing device processors, the at least one first sensor data, thereby generating first pre-processed sensor data, wherein the pre-processing the at least one first sensor data comprises executing a first computer-implemented signal conditioning operation comprising a first noise reduction operation and a first outlier suppression operation;

determining, using the one or more computing device processors, based on a first accessing of one or more intelligence models, first driving environment data associated with the first pre-processed sensor data;

determining, using the one or more computing device processors, based on a second accessing of the one or more intelligence models associated with the first driving environment data, that the driving environment is not speed-controlled;

receiving, using the one or more computing device processors and the one or more advanced driver assistance systems, at least one second sensor data associated with the driving environment;

pre-processing, using the one or more computing device processors, the at least one second sensor data, thereby generating second pre-processed sensor data, wherein the pre-processing the at least one second sensor data comprises executing a second computer-implemented signal conditioning operation comprising a second noise reduction operation and a second outlier suppression operation;

determining, using the one or more computing device processors, based on a third accessing of the one or more intelligence models, second driving environment data associated with the second pre-processed sensor data;

determining, using the one or more computing device processors, based on a fourth accessing of the one or more intelligence models associated with the second driving environment data, that the driving environment is a speed-controlled driving environment, wherein the determining that the driving environment is the speed-controlled driving environment comprises:

applying a dynamic geofence to one or more digital datapoints associated with the driving environment, updating a digital radius associated with the dynamic geofence based on the second driving environment data, identifying a data object comprised in the digital radius, and analyzing the data object to determine the speed-controlled driving environment;

in response to determining the speed-controlled driving environment, initiating, using the one or more computing device processors, a first alert associated with the speed-controlled driving environment to a first computing device associated with a vehicle;

monitoring, using the one or more computing device processors and the one or more advanced driver assistance systems, for a response associated with a vehicle operator associated with the vehicle to the first alert or a speed of the vehicle;

receiving, using the one or more computing device processors and the one or more advanced driver assistance systems, the response associated with the vehicle operator to the first alert or the speed of the vehicle;

determining, using the one or more computing device processors, the response associated with the vehicle operator to the first alert is insufficient to comply with, or the speed of the vehicle is insufficient to comply with, the speed-controlled driving environment; and generating, using the one or more computing device processors, based on the determining the response associated with the vehicle operator to the first alert is insufficient to comply with, or the speed of the vehicle is insufficient to comply with, the speed-controlled driving environment, a second alert associated with the speed-controlled driving environment to the first computing device, wherein the second alert comprises a higher alert intensity than the first alert.

15. The method of claim 14, wherein the one or more advanced driver assistance systems comprise using or communicating with at least one of: a camera, a radar sensor, a light detection and ranging (LiDAR) sensor, a global positioning system (GPS) sensor, a vehicle telemetry sensor, or a weather sensor.

16. The method of claim 14, wherein determining at least one of the first driving environment data or the second driving environment data comprises one or more feature extraction processes, wherein the one or more feature extraction processes are based on at least one of: a road analysis, an infrastructure classification, a vegetation analysis, a traffic density estimation, or a vehicle behavior pattern recognition.

17. The method of claim 14, wherein the one or more intelligence models are based on one or more deep learning classification models, wherein the one or more deep learning classification models comprise at least one of: a convolutional neural network, a recurrent neural network, a transformer system, or an ensemble method.

18. The method of claim 14, further comprising sharing, using the one or more computing device processors, at least one of the first alert or the second alert to one or more vehicles.

19. The method of claim 14, further comprising sharing, using the one or more computing device processors, at least one of the first alert or the second alert to one or more traffic management systems.

20. The method of claim 14, wherein the one or more computing device processors are comprised in one or more computing systems, wherein the one or more computing systems are located in one or more locations.

* * * * *